United States Patent
Okita et al.

(10) Patent No.: US 7,486,882 B2
(45) Date of Patent: Feb. 3, 2009

(54) LENS UNIT AND IMAGING APPARATUS

(75) Inventors: Atsushi Okita, Aichi (JP); Mitsuru Ichikawa, Saitama (JP); Takatoshi Uneme, Tokyo (JP); Fujio Kanai, Kanagawa (JP)

(73) Assignee: Sony Corporation, Tokyo (JP)

( * ) Notice: Subject to any disclaimer, the term of this patent is extended or adjusted under 35 U.S.C. 154(b) by 85 days.

(21) Appl. No.: 11/543,803

(22) Filed: Oct. 6, 2006

(65) Prior Publication Data

US 2007/0086770 A1     Apr. 19, 2007

(30) Foreign Application Priority Data

Oct. 17, 2005   (JP)   ............... 2005-301976

(51) Int. Cl.
G03B 17/00   (2006.01)
(52) U.S. Cl. ............... 396/55; 396/77; 396/133; 396/421
(58) Field of Classification Search ............ 396/55, 396/421, 77; 367/165
See application file for complete search history.

(56) References Cited

U.S. PATENT DOCUMENTS

| | | | | |
|---|---|---|---|---|
| 3,687,047 A | * | 8/1972 | Ito | ............... 396/509 |
| 4,601,539 A | | 7/1986 | Watanabe | |
| 5,289,318 A | * | 2/1994 | Sekine et al. | ............... 359/813 |
| 2001/0015860 A1 | * | 8/2001 | Nomura et al. | ............... 359/701 |
| 2005/0111113 A1 | * | 5/2005 | Shirie | ............... 359/701 |
| 2006/0181632 A1 | * | 8/2006 | Makii et al. | ............... 348/335 |
| 2006/0181748 A1 | * | 8/2006 | Makii et al. | ............... 358/500 |

FOREIGN PATENT DOCUMENTS

| | | |
|---|---|---|
| EP | 0 469 532 A2 | 2/1992 |
| JP | 08-015593 | 1/1996 |
| JP | 3387173 | 1/2003 |
| JP | 2004-280031 | 10/2004 |
| JP | 2005-258355 | 9/2005 |

* cited by examiner

*Primary Examiner*—Rochelle-Ann J Blackman
*Assistant Examiner*—Michael A Strieb
(74) *Attorney, Agent, or Firm*—Finnegan, Henderson, Farabow, Garrett & Dunner, L.L.P.

(57) ABSTRACT

A lens unit includes a lens barrel, an imaging system arranged therein; a movable part having a movable lens, moved in an optical axis with respect to the lens barrel; a linear actuator for moving the movable part in the optical axis direction; and a biasing plate spring having a holding section that holds the movable part, spring sections that can be resiliently deformed and bias the movable part in the optical axis direction, and attached sections that are attached to the lens barrel, the thickness direction of the plate spring coinciding with the optical axis, wherein the holding section of the biasing plate spring is formed into a circular arc; and at least a portion of the spring sections of the plate spring are formed into a shape extending in a direction substantially along the holding section on the outer peripheral side of the holding section.

6 Claims, 38 Drawing Sheets

FIG. 2
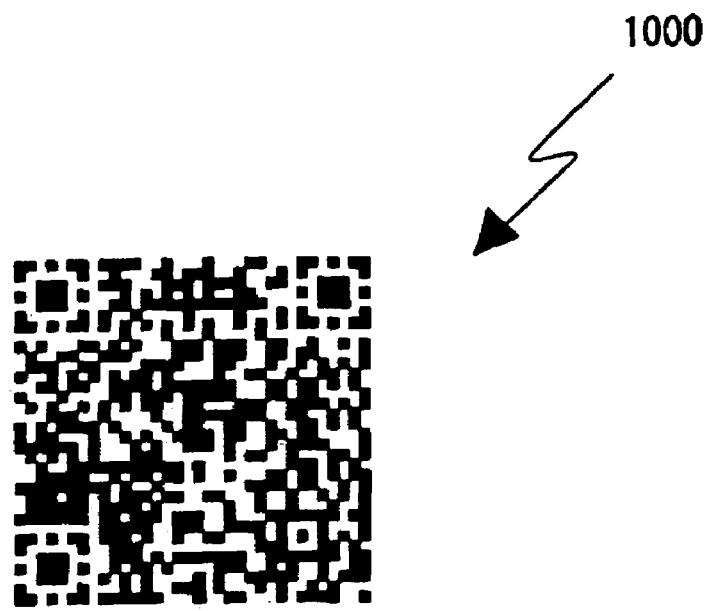
1000
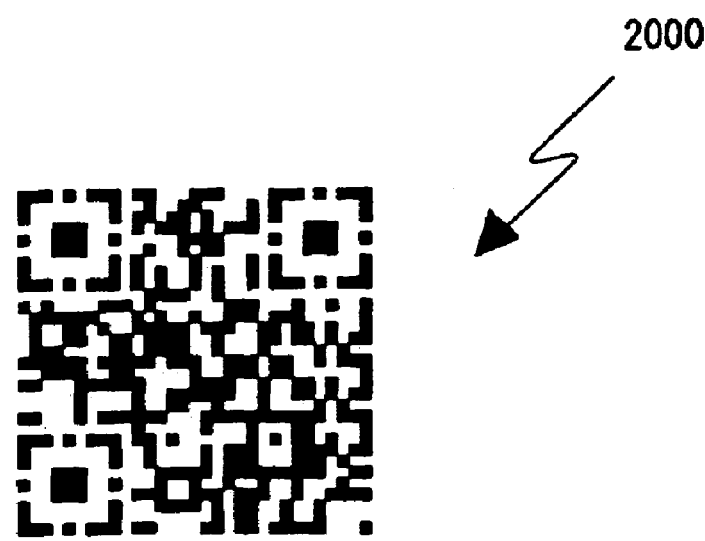
2000

LENS UNIT AND IMAGING APPARATUS

BACKGROUND OF THE INVENTION

1. Field of the Invention

The present invention relates to a lens unit and an imaging apparatus. More particularly, this invention relates to a lens unit and an imaging apparatus which realize downsizing by holding a movable part by biasing plate springs and devising shapes of the biasing plate springs.

2. Related Art

A lens unit in which an imaging optical system such as movable lenses is arranged in a lens barrel is incorporated into various types of imaging apparatuses such as a video camera, a still camera and a cellular phone, and there is an imaging apparatus provided with a movable part having movable lenses for zoom or for focus, which can be moved in an optical axis direction by a linear actuator. See Japanese Patent No. 3387173 and Japanese Patent Application Publication No. H8-15593, for example.

In the above-described imaging apparatus, the movable part is supported movably in the optical axis direction by a pair of guide shafts, and is moved in a direction according to an energization direction to a driving coil by energizing the driving coil of the linear actuator.

SUMMARY OF THE INVENTION

However, in the above-described conventional imaging apparatus, since there exists a guide mechanism including the guide shafts for guiding the movable part, large arrangement space is required, which can be a factor impeding the downsizing.

Consequently, the present invention addresses the above-described problem and is intended to realize the downsizing.

In order to solve the above-described issue, in a lens unit and an imaging apparatus according to the present invention; there are provided a lens barrel in which an imaging optical system is arranged, a movable part that has movable lenses and is moved in an optical axis direction with respect to the lens barrel, a linear actuator that moves the above-mentioned movable part in the optical axis direction, and a biasing plate spring that has a holding section that holds the above-mentioned movable part, spring sections that can be resiliently deformed and bias the movable part in the optical axis direction, and attached sections that are attached to the above-mentioned lens barrel, and the thickness direction of which coincides with the optical axis direction, and the holding section of the biasing plate spring is formed into a circular arc, and at least a portion of the spring sections of the biasing plate spring are formed into a shape extending in a direction substantially along the holding section on the outer peripheral side of the holding section.

Accordingly, in the lens unit and the imaging apparatus of the present invention, the spring sections are located close to the holding section in the biasing plate spring.

The lens unit according to an embodiment of the present invention includes a lens barrel in which an imaging optical system is arranged, a movable part that has movable lenses and is moved in an optical axis direction with respect to the lens barrel, a linear actuator that moves the above-mentioned movable part in the optical axis direction, and a biasing plate spring that has a holding section that holds the above-mentioned movable part, spring sections that can be resiliently deformed and bias the movable part in the optical axis direction, and attached sections that are attached to the above-mentioned lens barrel, and the thickness direction of which coincides with the optical axis direction, and the holding section of the biasing plate spring is formed into a circular arc, and at least a portion of the spring sections of the biasing plate spring are formed into a shape extending in a direction substantially along the holding section on the outer peripheral side of the holding section.

Accordingly, arrangement space for the biasing plate spring can be reduced, and the downsizing of the lens unit can be realized.

According to one embodiment of the present invention, since regulating surface sections that regulate movement of the movable part in the optical axis direction are formed in the lens barrel, and regulated surface sections that come into contact with the regulating surface sections of the above-mentioned lens barrel so that the movement is regulated are formed at positions spaced evenly in a circumferential direction of the movable part about an optical axis, impact caused by the contact between the movable part and the lens barrel when the movable part reaches an movement end can be efficiently absorbed, and the posture of the movable part can be stabilized.

According to one embodiment of the present invention, since first regulated surface sections and second regulated surface sections are formed as the regulated surface sections, and the first regulated surface sections and the second regulated surface sections are different in distance from the regulating surface sections in the optical axis direction, even if large load is applied to the movable part, the large load is not applied only to one of the first regulated surface sections and the second regulated surface sections, so that damage, abrasion and the like of the movable part or the lens barrel can be prevented.

According to one embodiment of the present invention, since the above-mentioned movable part is configured by a lens block including a plurality of lenses, a lens holder holding the above-mentioned lens block, a coil holder to which the above-mentioned lens holder is attached, and a driving coil wound around the above-mentioned coil holder, and the above-mentioned regulated surface sections are formed in the lens holder, position accuracy of the lens block in the optical axis direction can be improved and the posture of the lens block can be stabilized.

According to one embodiment of the present invention, since a pair of the above-mentioned biasing plate springs are provided separately in the optical axis direction of the movable part, and the holding section, the spring sections and the attached sections of one of the biasing plate springs are located coplanarly at one movement end in the optical axis direction of the movable part, the spring sections deformed when the movable part is moved can be arranged at positions overlapping the movable part in the optical axis direction, which can reduce the arrangement space for the biasing plate springs in a direction perpendicular to the optical axis direction, so that the downsizing of the lens unit can be realized.

An imaging apparatus according to an embodiment of the present invention is an imaging apparatus having a lens unit configured such that an imaging optical system is arranged in the lens barrel, and an imaging element, and the lens unit includes the lens barrel in which the imaging optical system is arranged, a movable part that has movable lenses and is moved in an optical axis direction with respect to the lens barrel, a linear actuator that moves the above-mentioned movable part in the optical axis direction, and a biasing plate spring that has a holding section that holds the above-mentioned movable part, spring sections that can be resiliently deformed and bias the movable part in the optical axis direction, and attached sections that are attached to the above-mentioned lens barrel, and the thickness direction of which coincides with the optical axis direction, and is characterized in that the holding section of the biasing plate spring is formed into a circular arc, and that at least a portion of the spring sections of the biasing plate spring are formed into a shape extending in a direction substantially along the holding section on the outer peripheral side of the holding section.

Accordingly, arrangement space for the biasing plate spring can be reduced, and the downsizing of the imaging apparatus can be realized.

BRIEF DESCRIPTION OF THE DRAWINGS

The present invention will become more readily appreciated and understood from the following detailed description of embodiments and examples of the present invention when taken in conjunction with the accompanying drawings, in which:

FIG. 2 is an enlarged plane view showing examples of two-dimensional barcode;

DETAILED DESCRIPTION OF THE EMBODIMENTS

Hereinafter, preferred embodiments for carrying out the present invention are described with reference to the accompanying drawings. The present invention can be applied to various types of imaging apparatuses each having a function of moving picture photographing or still picture photographing, such as a cellular phone, video camera, still camera or the like.

Figure 1:
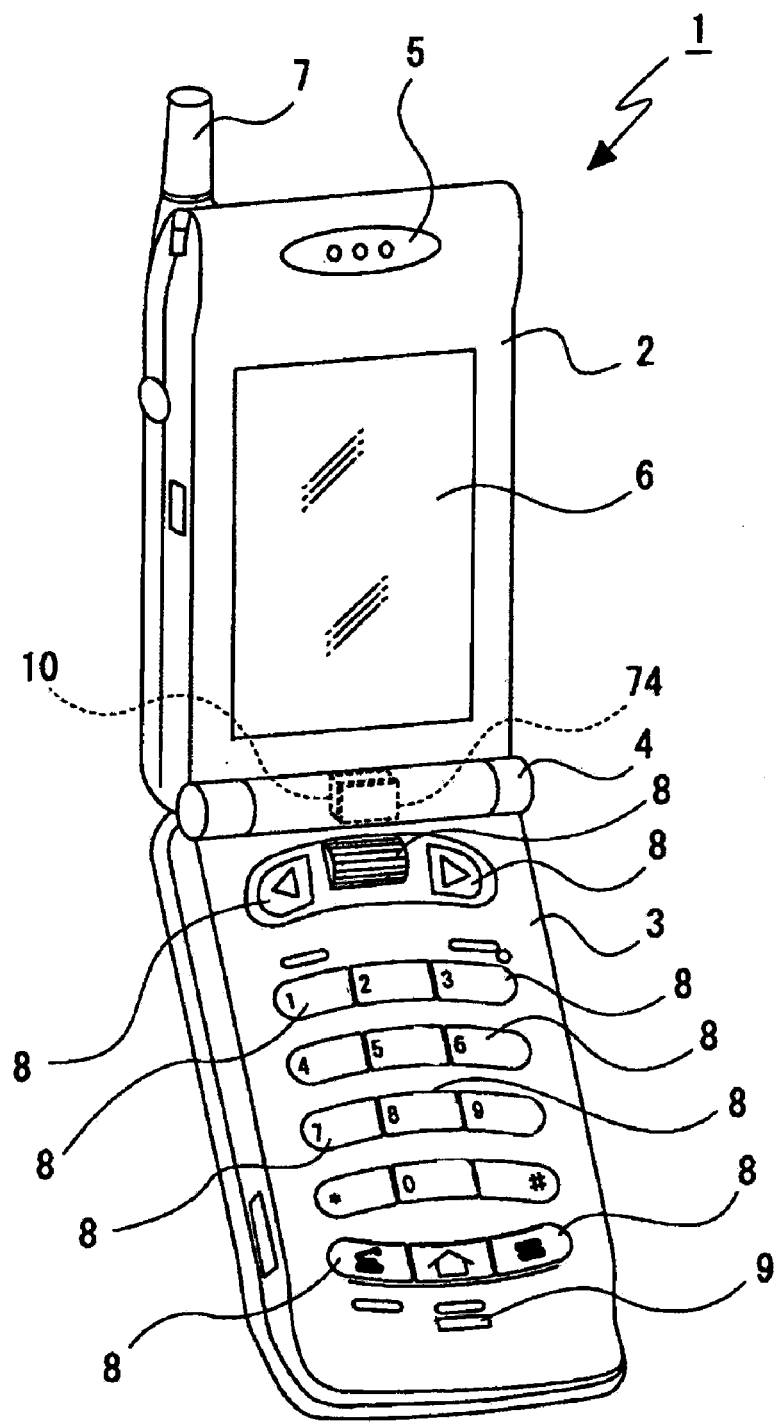
FIG. 1 shows an embodiment of the present invention together with the FIGS. 2 to 40, and is a perspective view showing a cellular phone as one example of an imaging apparatus.

As an imaging apparatus 1, for example, a cellular phone is shown in FIG. 1. In the imaging apparatus 1, a first casing 2 and a second casing 3 are coupled through a hinge part 4 so as to be freely folded.

The first casing 2 is provided with a speaker 5, a display part 6 and an antenna 7, and the antenna 7 is constituted flexibly.

The second casing 3 is provided with various operating parts 8, 8, . . . including push buttons and a rotary dial and a microphone 9.

An imaging unit 10 and a shutter unit described later are incorporated in the hinge part 4. A predetermined push button of the operating parts 8, 8 . . . functions as the operating part 8 for photographing an image, and pushing operation of this operating part 8 actuates the imaging unit 10 and the shutter unit, thereby allowing photographing of the image.

The imaging apparatus 1 also has a function of reading and identifying various displays intended for identification, for example, information such as a one-dimensional barcode or two-dimensional barcodes 1000, 2000 (refer to FIG. 2). Once these barcodes are photographed by the imaging unit 10, code patterns are recognized and the information based on the recognized code patterns are read.

Next, a configuration example of the imaging unit 10 is described. Hereinafter, the description is given with an optical axis direction (S shown in FIG. 3) being an anteroposterior direction and an object side being a front side for convenience.

In the imaging unit 10, required parts are arranged in a lens barrel 11. The imaging unit 10 is composed of a lens unit 10a and an imaging part having an imaging element described later, and in the lens barrel 11, a first member 12 and a second member 13 are coupled back and forth (refer to FIGS. 3 to 6). The first member 12 and the second member 13 are formed of a resin material such as polycarbonate, for example.

Figure 7:
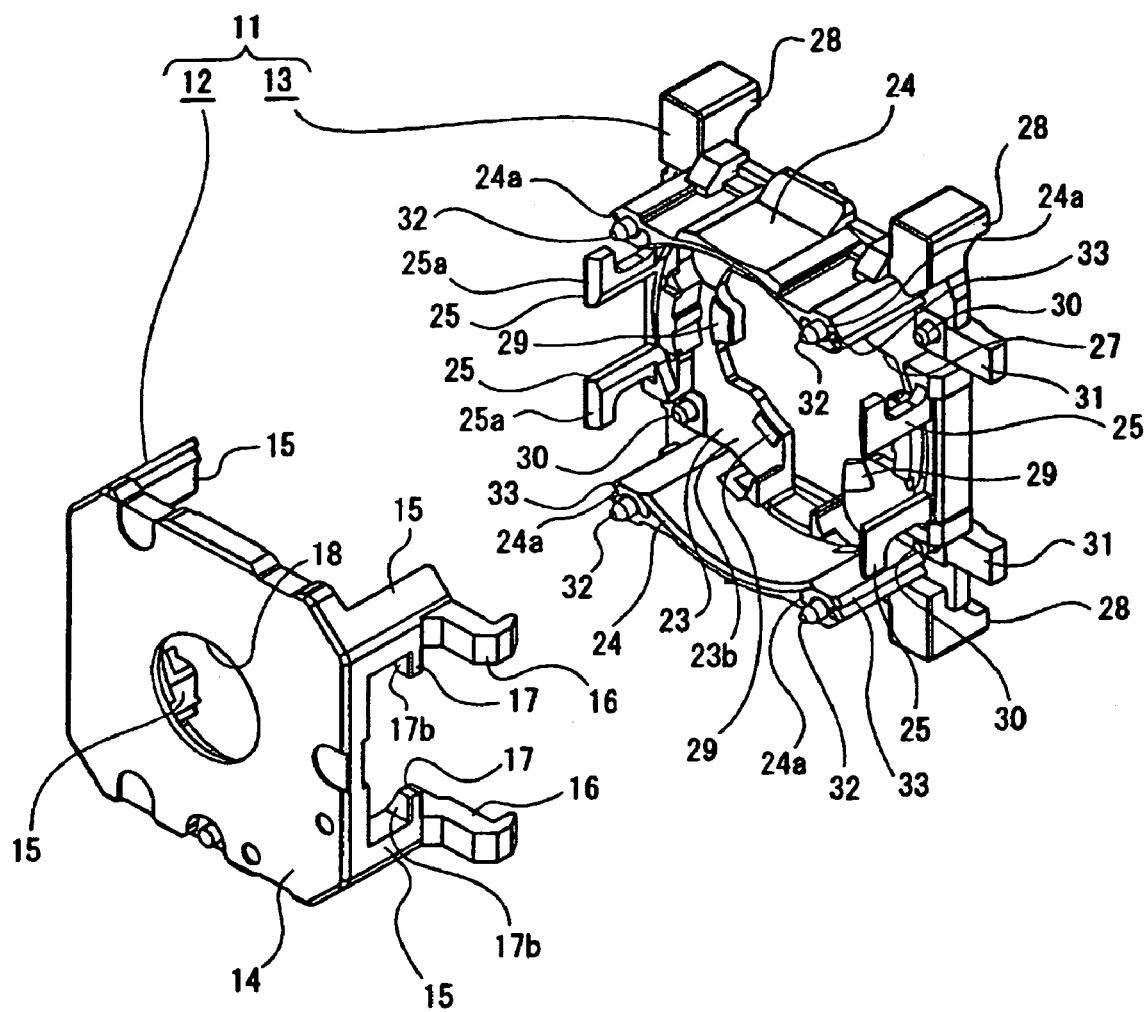
FIG. 7 is an enlarged exploded perspective view of a lens barrel.
Figure 8:
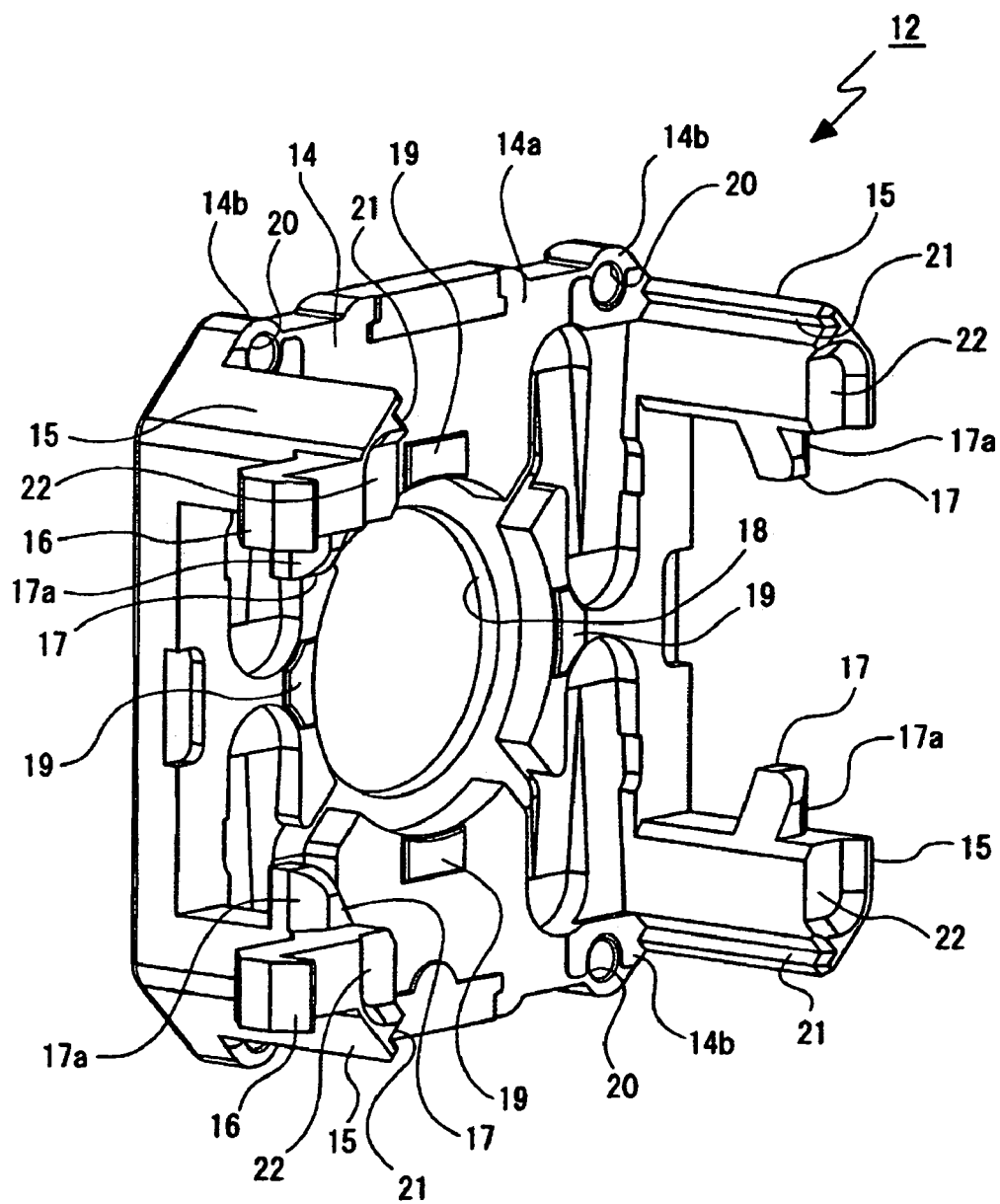
FIG. 8 is an enlarged perspective view showing a first member of the lens barrel when seen from a direction different from that of FIG. 7.

In the first member 12, as shown in FIGS. 7 and 8, there are integrally formed a base surface section 14 which faces in the anteroposterior direction and is formed into a substantially rectangular shape, projecting sections 15, 15, . . . which are projected backward from four corners of the base surface section 14, respectively, spring folding sections 16, 16 which are projected outward (in a lateral direction) from the two projecting sections 15, 15, and fixing pieces 17, 17, . . . which are projected upward or downward respectively so as to come close to each other from positions close to back ends of the projecting sections 15, 15, . . . .

A transmission hole 18 penetrating anteroposteriorly is formed in a central portion of the base surface section 14.

A back surface 14a of the base surface section 14 is provided with regulating surface sections 19, 19, . . . which are slightly projected backward at positions around the transmission hole 18 (referred to FIG. 8). The regulating surface sections 19, 19, . . . can be contacted by a movable part described later when the movable part is moved forward, and thus, has a function of regulating the forward movement of the movable part. A position where the movable part comes into contact with the regulating surface sections 19, 19, . . . is a micro end in focus driving.

At positions of four corners of the base surface 14a of the base surface section 14, positioning holes 20, 20, . . . are formed, respectively.

In the imaging apparatus, 1, as described later, the movable part is moved from the infinity side to the macro end side by the driving of a linier actuator by energization to a driving coil. The movable part can be moved just before the position where the movable part comes into contact with the regulating surface sections 19, 19, . . . , and this position just before may be set as the macro end which is a movement end of the movable part on the front side.

In the projecting sections 15, 15, . . . of the first member 12, guided grooves 21, 21, . . . each of which extends anteroposteriorly are formed.

Escape depressions 22, 22, . . . are formed in back end surfaces of the projecting sections 15, 15, . . . , respectively.

Portions around the positioning holes 20, 20, . . . in the back surface 14a of the base surface section 14 are formed as four spring holding surfaces 14b, 14b, respectively (refer to FIG. 8).

In the fixing pieces 17, 17, . . . of the first member 12, in respective outside surfaces thereof, there are formed inclined surfaces 17a, 17a, . . . , which are displaced inward as they go backward (refer to FIG. 8). In the fixing pieces 17, 17, . . . , opposed surfaces 17b, 17b, . . . facing forward respectively are formed. Accordingly, in the fixing pieces 17, 17, . . . , the inclined surfaces 17a, 17a, . . . are formed on the back side, and the front end surfaces are formed as the opposed surfaces 17b, 17b, . . . .

Figure 9:
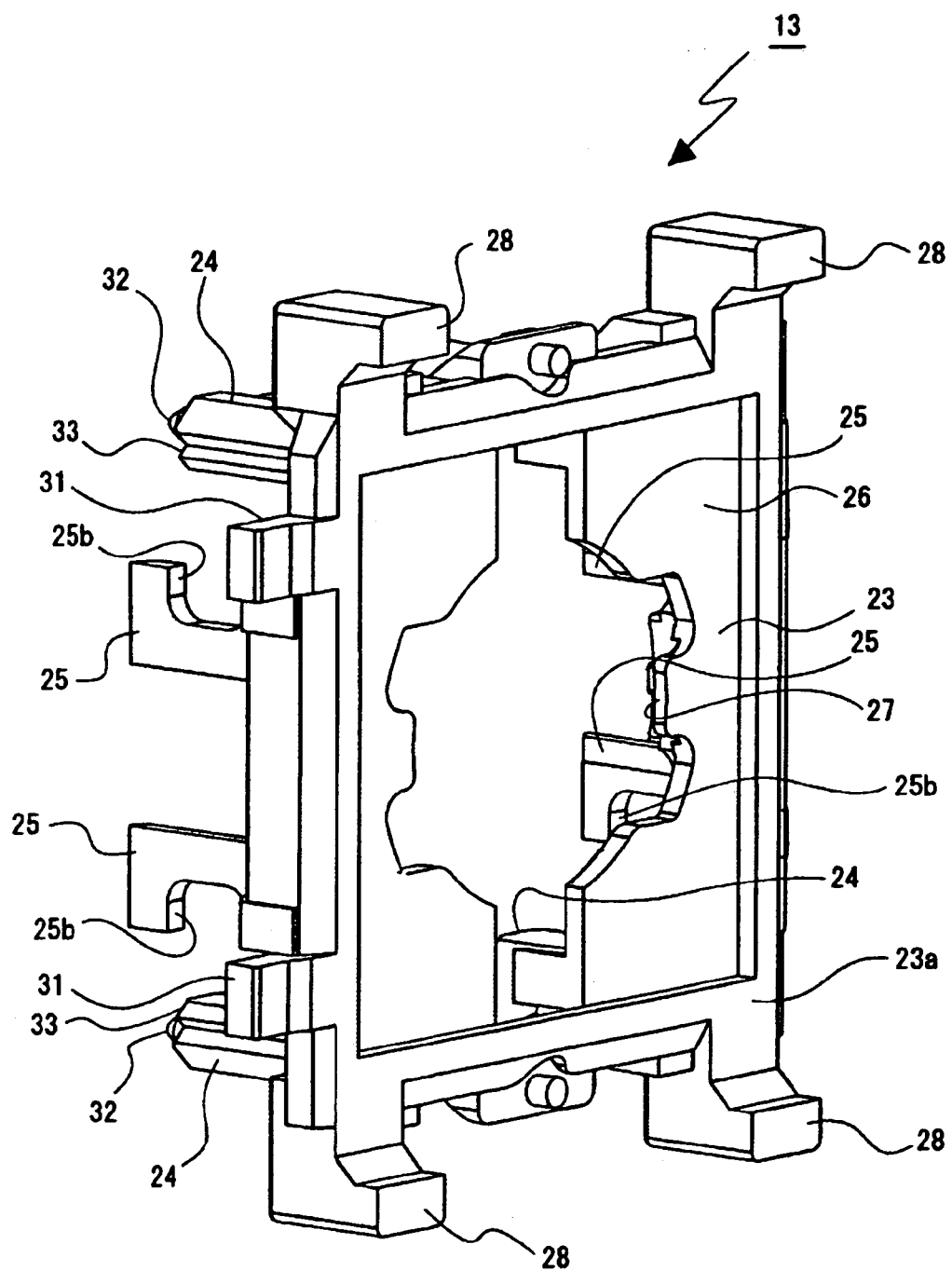
FIG. 9 is an enlarged perspective view showing a second member of the lens barrel when seen from a direction different from that of FIG. 7.

In the second member 13, as shown in FIGS. 7 and 9, there are integrally formed a base surface section 23 facing in the anteroposterior direction, projecting sections 24, 24 which are projected forward from both upper and lower side edges of the base surface section 23, respectively, and fixing pieces 25, 25 which are projected forward from both left and right side edges of the base surface section 23, respectively. Two of the fixing pieces 25, 25, . . . are provided vertically separately in each of the left and right side edges.

A rectangular shallow arrangement depression 26 is formed in a back surface 23a of the base surface section 23 (refer to FIG. 9). An optical transmission hole 27 penetrating anteroposteriorly is formed in a central portion of the base surface section 23. In a back surface 23a of the base surface section 23, positioning projections 28, 28, . . . which are projected backward are provided at four corners thereof.

Figure 10:
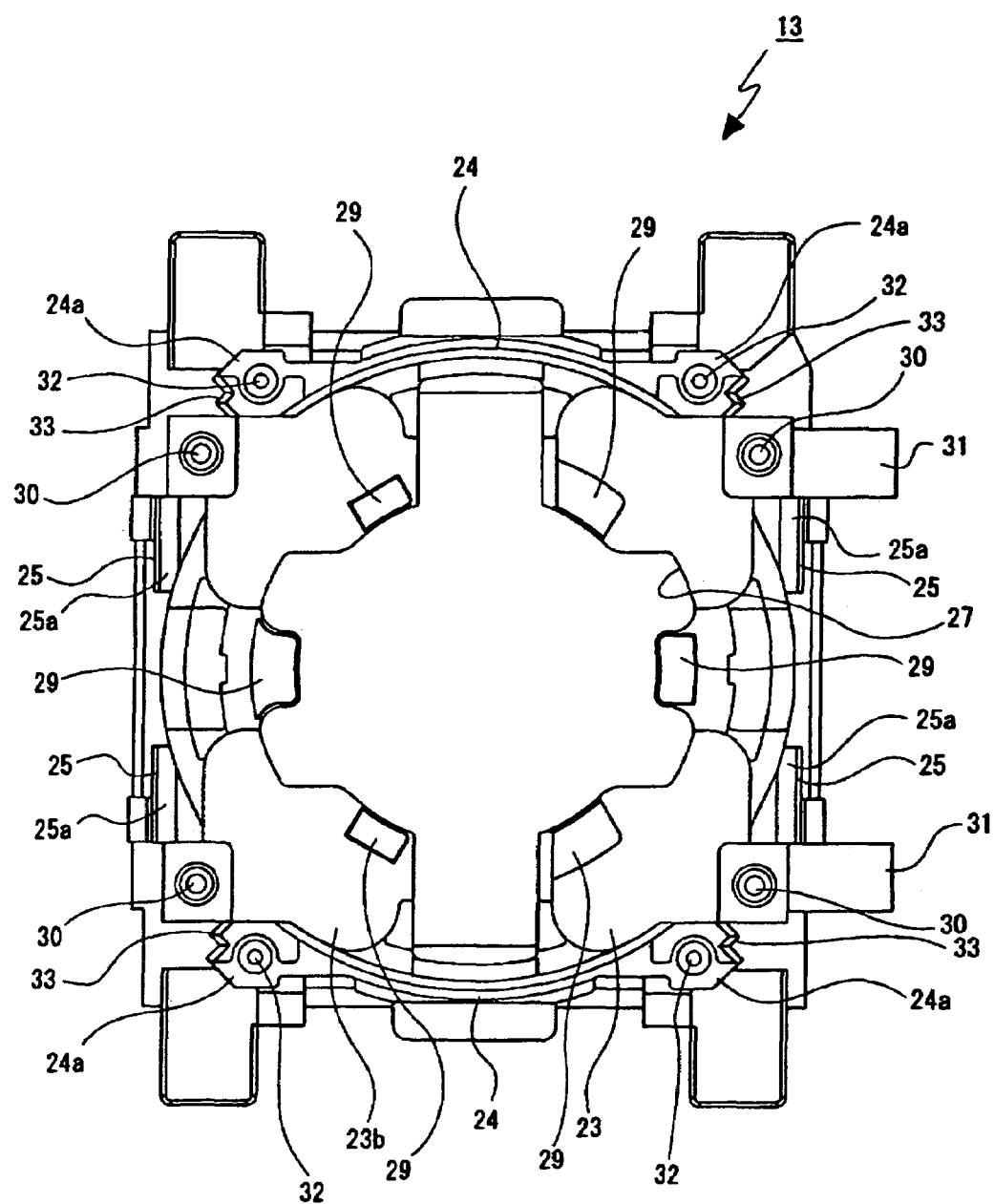
FIG. 10 is an enlarged front view of the second member of the lens barrel.

In a front surface 23b of the base surface section 23, for example, six regulating surface sections 29, 29, . . . are provided at positions around the optical transmission hole 27 (refer to FIGS. 7 and 10). The regulating surface sections 29, 29, . . . are provided at positions spaced evenly in a circumferential direction so as to be slightly projected forward.

The regulating surface sections 29, 29, . . . have a function of regulating the backward movement of the movable part by being contacted by the movable part when the movable part is moved backward. The position where the movable part comes into contact with the regulating surface sections 29, 29, . . . is infinity in the focus driving.

In the imaging apparatus 1, as in the above-described macro end, by controlling an energization amount to the driving coil, the movable part can be moved just before the position where the movable part comes into contact with the regulating surface sections 29, 29, . . . , and this position just before may be set as the infinity, which is a movement end of the movable part on the back side.

In the front surface 23b of the base surface section 23, crimp pins 30, 30, . . . are provided at positions of four corners thereof, respectively (FIGS. 7 and 10).

In the right end portion of the base surface section 23 when seen from the front side, spring receiving sections 31, 31, . . . , which are projected laterally and are separated vertically, are provided.

In each of tip surfaces of the projecting sections 24, 24 of the second member 13, positioning pins 32, 32, . . . are provided in both left and right end portions, and portions around the positioning pins 32, 32, . . . in the tip surfaces of the projecting sections 24, 24 are formed as spring holding surfaces 24a, 24a, . . . , respectively. In both the left and right end portions of the projecting sections 24, 24, guiding projections 33, 33, . . . each extending anteroposteriorly are provided.

The fixing pieces 25, 25 are each formed into an L shape falling sideways, and in outer surfaces of front end portions thereof, there are formed inclined surfaces 25a, 25a, . . . , which are displaced outward as they go forward. In the fixing pieces 25, 25, . . . , opposed surfaces 25b, 25b, . . . facing backward are formed. Accordingly, in the fixing pieces 25, 25, . . . , on the front side, the inclined surfaces 25a, 25a, . . . are formed, and the back end surfaces are formed as the opposed surfaces 25b, 25b, . . . .

Figure 3:
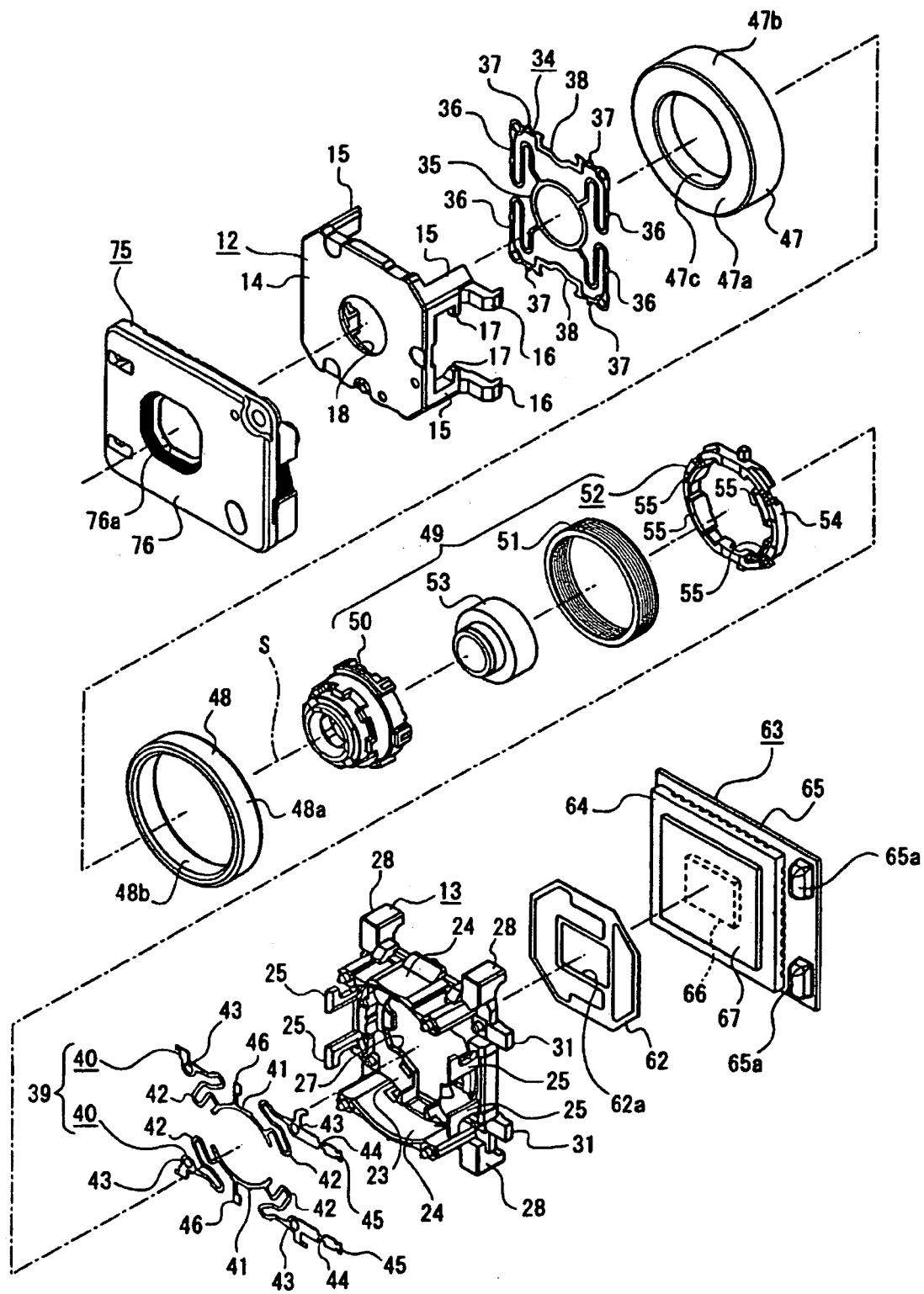
FIG. 3 is an exploded perspective view showing an imaging unit and a shutter unit.
Figure 4:
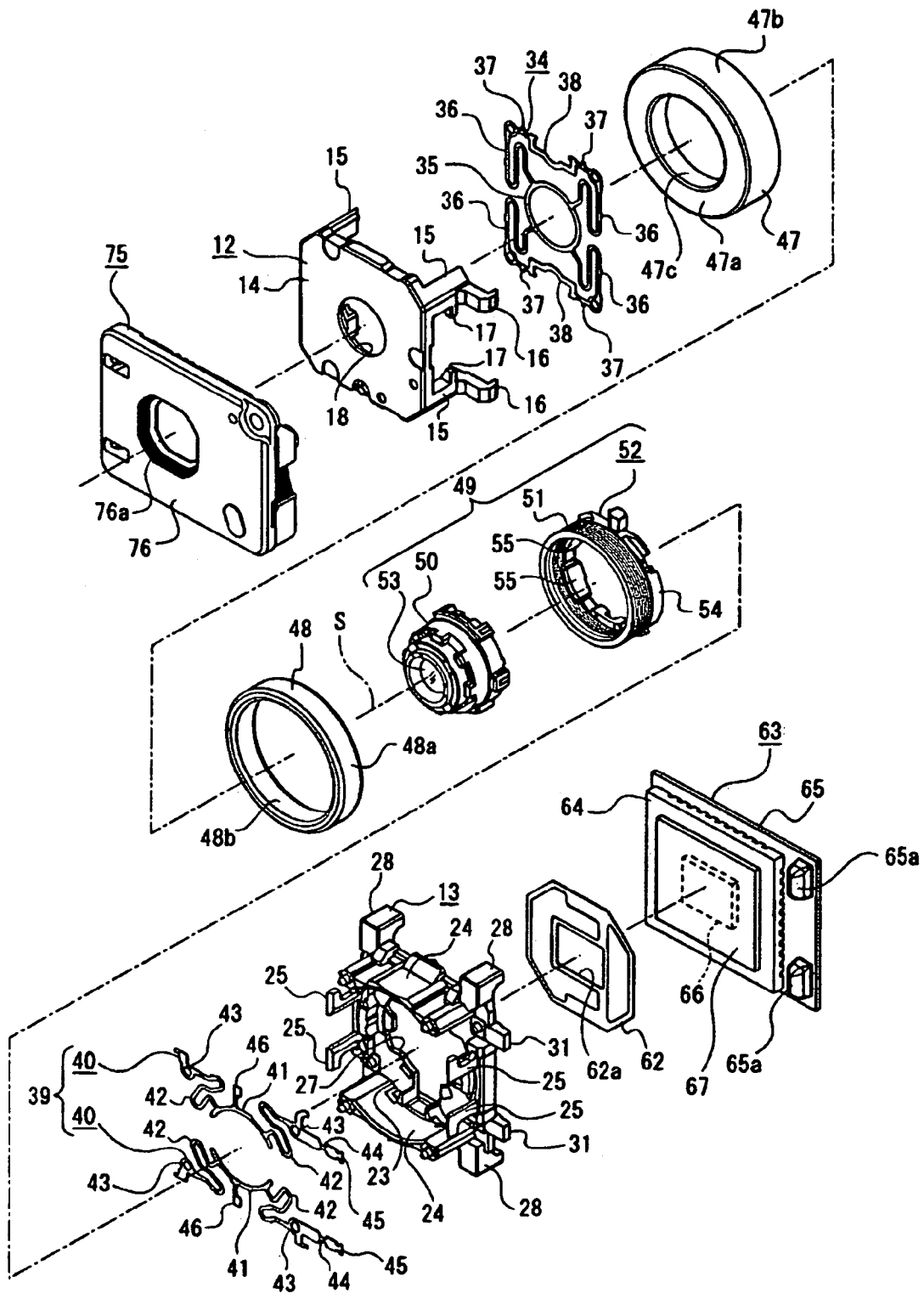
FIG. 4 is an exploded perspective view showing the imaging unit and the shutter unit, which are partially in an assembled state.

A first biasing plate spring 34 is attached to the lens barrel 11 (refer to FIGS. 3 and 4).

Figure 11:
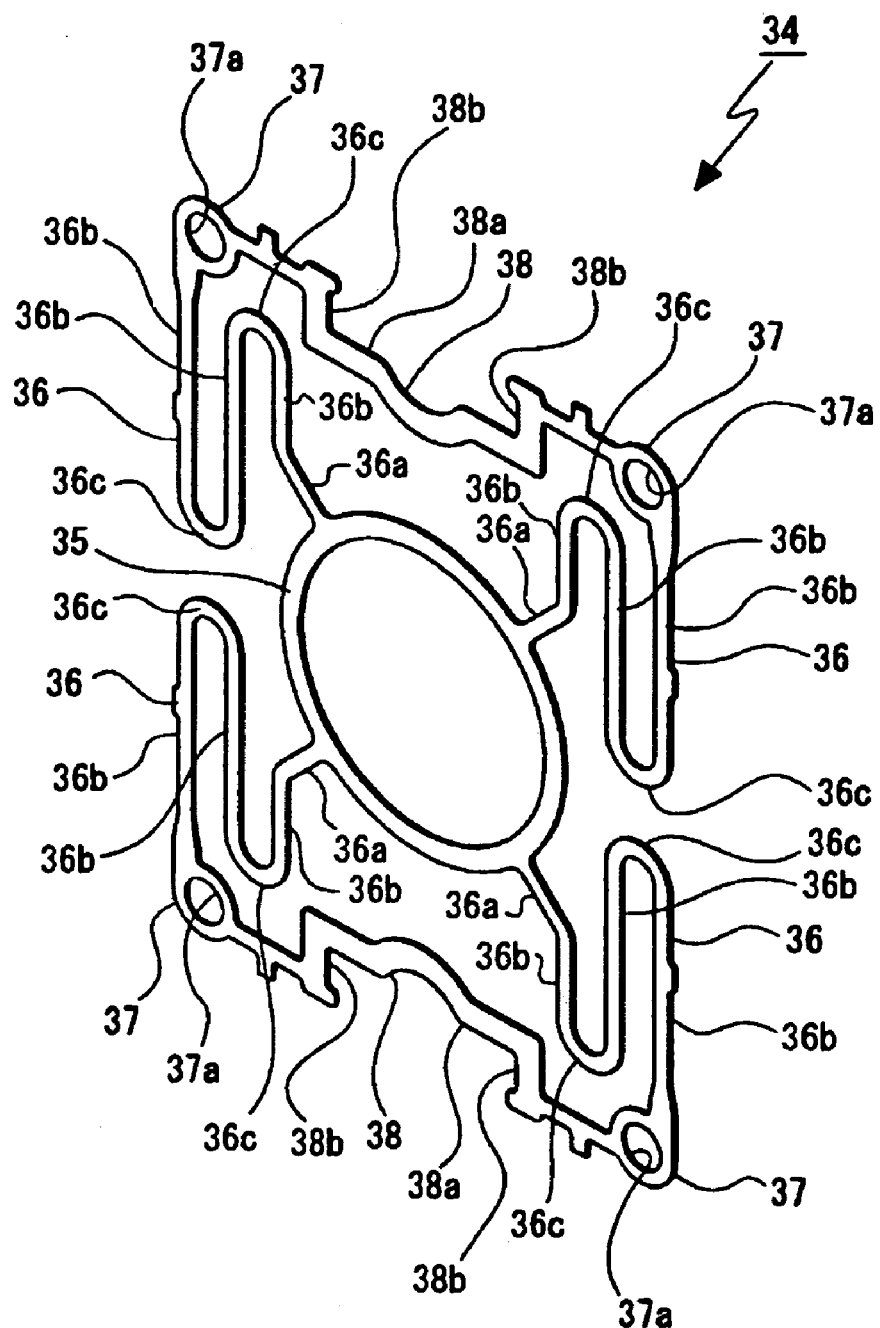
FIG. 11 is an enlarged perspective view of a first biasing plate spring.

The first biasing plate spring 34 is formed of a metal material having high resilience, for example, beryllium copper or the like, and a thickness direction thereof coincides with the anteroposterior direction, that is, optical axis direction. In the first biasing plate spring 34, as shown in FIG. 11, a holding section 35, four spring sections 36, 36, . . . , four attached sections 37, 37, . . . and joining sections 38, 38 are integrally formed.

The holding section 35 is formed into an annular shape.

The spring sections 36, 36, . . . are each formed into a substantially S shape falling sideways, one-ends of which are continued at positions spaced evenly in a circumferential direction of the holding section 35. The spring section 36 is composed of an inclined section 36a projected shortly in a radial direction from the holding section 35, three parallel linear sections 36b, 36b, 36b extending vertically, and semicircular arc bent sections 36c, 36c joining between the adjacent linear sections 36b, 36b, 36b, and one end of the linear section 36b located innermost is continued to the other end of the inclined section 36a.

The attached sections 37, 37 extend laterally long, outer ends of which are each continued to one-ends of the linear sections 36b, 36b, located outermost.

The joining sections 38, 38 are composed of horizontal sections 38a, 38a extending laterally and vertical sections 38b, 38b, . . . extending vertically short, one-ends of which are continued to both left and right end portions of the horizontal sections 38a, 38a, respectively, and the other ends of the vertical sections 38b, 38b, . . . are continued to inner ends of the attached sections 37, 37. In the joining sections 38, 38, the horizontal sections 38a, 38a are located closer to the holding section 35 side than the attached sections 37, 37 are.

In the attached sections 37, 37, . . . , attached holes 37a, 37a, . . . are formed, respectively.

Since vertical positions of the spring sections 36, 36, . . . are axisymmetric, and lateral positions of the spring sections 36, 36, . . . are also axisymmetric, the first biasing plate spring 34 is configured so that the respective spring sections 36, 36, . . . exert the same spring force.

In the first biasing plate spring 34, by resiliently displacing the spring sections 36, 36, . . . in a direction deflecting anteroposteriorly, the holding section 35 is moved in the anteroposterior direction (optical axis direction) with respect to the attached sections 37, 37, . . . , while force generated in a surface perpendicular to the optical axis at this time is suppressed by the linear sections 36b, 36b, . . . and the bent sections 36c, 36c, . . . , so that the holding section 35 is only moved in the optical axis direction.

The first biasing plate spring 34 is attached to the lens barrel 11 in a state where the positioning pins 32 of the second member 13 are inserted into the attached hole 37a, 37a, . . . , respectively, and the attached sections 37, 37, . . . are held between the spring holding surfaces 14b, 14b, . . . of the first member 12 and the spring holding surfaces 24a, 24a . . . of the second member 13. The positioning pins 32, 32, . . . are inserted into the positioning holes 20, 20, . . . of the first member 12 respectively to perform the positioning of the first member 12 and the second member 13.

A second biasing plate spring 39 is attached to the lens barrel 11 (refer to FIGS. 3 and 4).

The second biasing plate spring 39 is formed of a metal material having high resilience, for example, beryllium copper or the like, and a thickness direction thereof coincides with the anteroposterior direction, that is, optical axis direction. The second biasing plate spring 39 is composed of two spring members 40, 40, which are formed axisymmetrically in the vertical direction.

Figure 12:
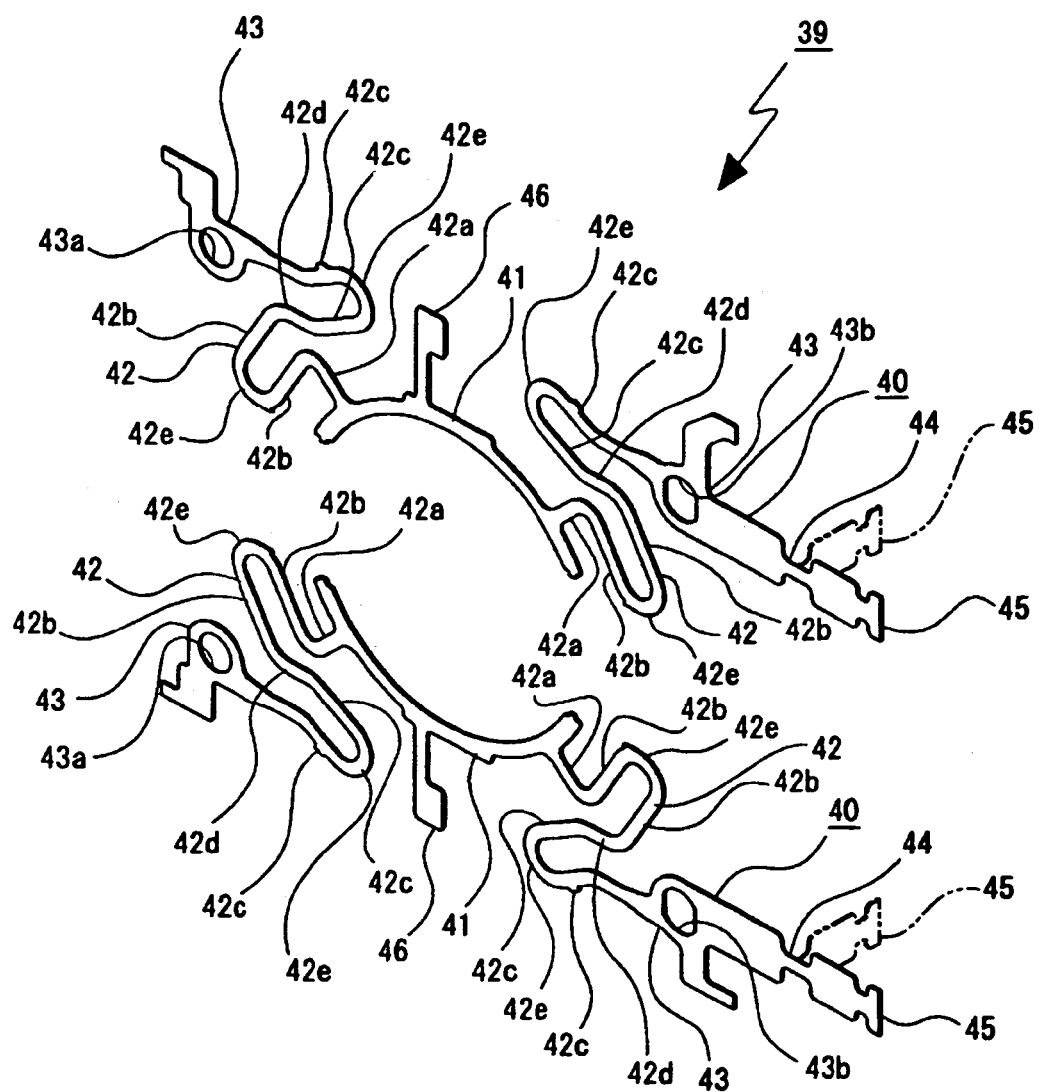
FIG. 12 is an enlarged perspective view of a second biasing plate spring.

In the spring member 40, as shown in FIG. 12, a holding section 41, two spring sections 42, 42, two attached sections 43, 43, a folding section 44, a connecting terminal section 45, and a coil connecting section 46 are integrally formed.

The holding section 41 is formed into a substantially circular arc.

The spring sections 42, 42, . . . are each formed into a substantial S shape, one-ends of which are continued to portions separated in a circumferential direction of the holding section 41. The spring section 42 is composed of an inclined section 42a projected short in a radial direction from the holding section 41, parallel first linear sections 42b, 42b extending in a substantially tangent line direction of the holding section 41, parallel second linear sections 42c, 42c extending in a substantially tangent line direction of the holding section 41, a linking section 42d joining one end of the first linear section 42b located outside and one end of the second linear section 42c located inside, and semi-circular arc bent sections 42e, 42e joining between the adjacent first linear sections 42b, 42b and between the adjacent second linear sections 42c, 42c, respectively. One end of the first linear section 42b located inside is continued to the other end of the inclined section 42a.

One-ends of the attached sections 43, 43 are continued to one-ends of the second linear sections 42c, 42c located outside. In the attached sections 43, 43, positioning holes 43a, 43b are formed, respectively. The positioning hole 43a is formed into a circle, and the positioning hole 43b is formed long vertically.

The connecting terminal section 45 is continued to one of the attached sections 43 through the folding section 44.

The attached section 43, the folding section 44 and the connecting terminal section 45 are formed long laterally, and a vertical width of the folding section 44 is made smaller than a vertical width of the attached section 43 and the connecting terminal section 45.

The coil connecting section 46 is projected in the radial direction from a central portion of the holding 41 in the circumferential direction, and provided in a central portion of a continuous portion between the holding section 41 and the spring sections 42, 42.

Since vertical positions of the spring sections 42, 42, . . . are axisymmetric, and lateral positions of the spring sections 42, 42, . . . are also axisymmetric, the second biasing plate spring 39 is configured so that the respective spring sections 42, 42, . . . exert the same spring force.

Moreover, since the second biasing plate spring 39 is arranged so as to be symmetric in the vertical direction, it can bias the movable part in the optical axis direction while ensuring good balance when the movable part having the movable lenses, which will be described later, is moved in the optical axis direction.

In the second biasing plate spring 39, by resiliently displacing the spring sections 42, 42, . . . in a direction deflecting forward, the holding sections 41, 41 are moved forward (optical axis direction) with respect to the attached sections 43, 43, . . . , while force generated in a surface perpendicular to the optical axis at this time is suppressed by the first linear sections 42b, 42b, . . . , the second linear sections 42c, 42c, . . . , the linking sections 42d, 42d, . . . , and the bent sections 42e, 42e, . . . , so that the holding sections 41, 41 are only moved in the optical axis direction.

Thickness of the second biasing plate spring 39 is smaller than that of the first biasing plate spring 34, so that the spring force of the first biasing plate spring 34 is larger than that of the second biasing plate spring 39.

Figure 13:
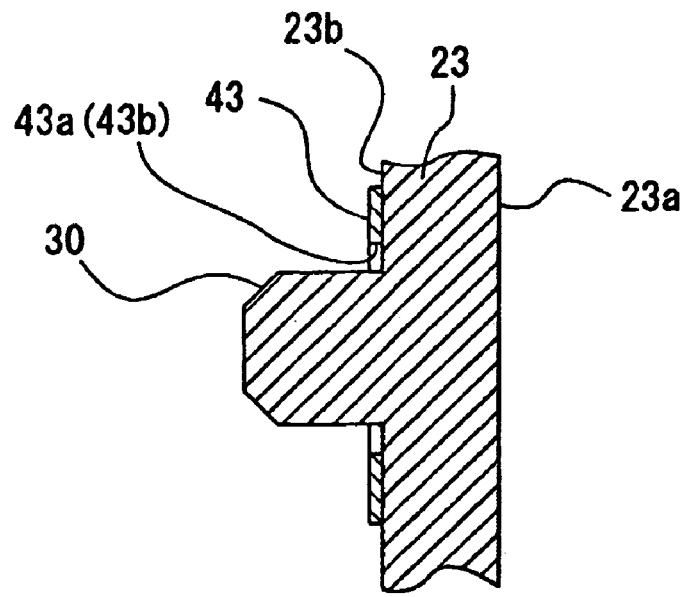
FIG. 13 is an enlarged cross-sectional view showing a state before crimp pins are crimped.
Figure 14:
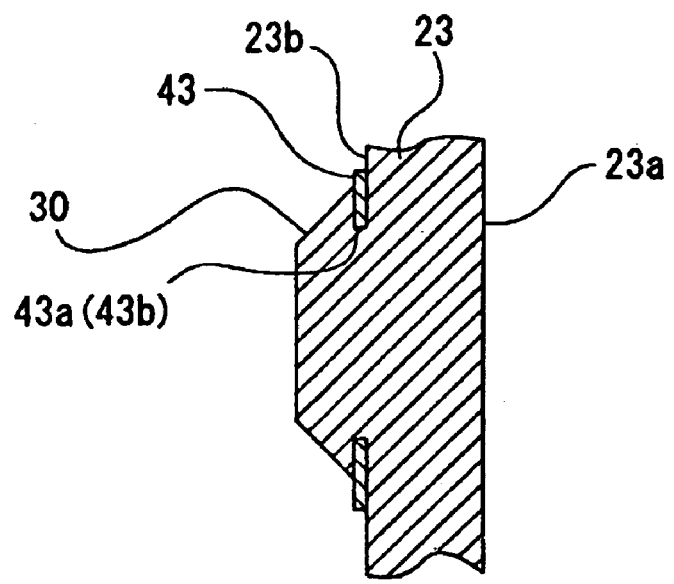
FIG. 14 is an enlarged cross-sectional view showing a state where the crimp pin is crimped and the second biasing plate spring is fixed to the second member.

In the second biasing plate spring 39, the crimp pins 30, 30, . . . of the second member 13 are inserted into the positioning holes 43a, 43b, . . . formed in the attached sections 43, 43, . . . , respectively (refer to FIG. 13). In a state where the crimp pins 30, 30, . . . are inserted into the positioning holes 43a, 43b, . . . , respectively, thermal crimping or ultrasonic crimping is performed to the crimp pins 30, 30, . . . (refer to FIG. 14) to attach the second biasing plate spring 39 to the second member 13.

When the crimp working of the crimp pins 30, 30, . . . is performed, the second biasing plate spring 39 and the second member 13 are held while being positioned and fixed by a jig so that the second biasing plate spring 39 is not displaced with respect to the second member 13 by a gap between the crimp pins 30, 30 and the vertically long positioning holes 43b, 43b.

Moreover, while in the foregoing, the example of providing the crimp pins 30, 30, . . . in the second member 13 to fix the second biasing plate spring 39 to the second member 13 by crimping is described, fixing means of the second biasing plate spring 39 to the second member 13 is not limited to crimping, but for example, another fixing means such as screw cramp and adhesive joining can also be used.

Figure 6:
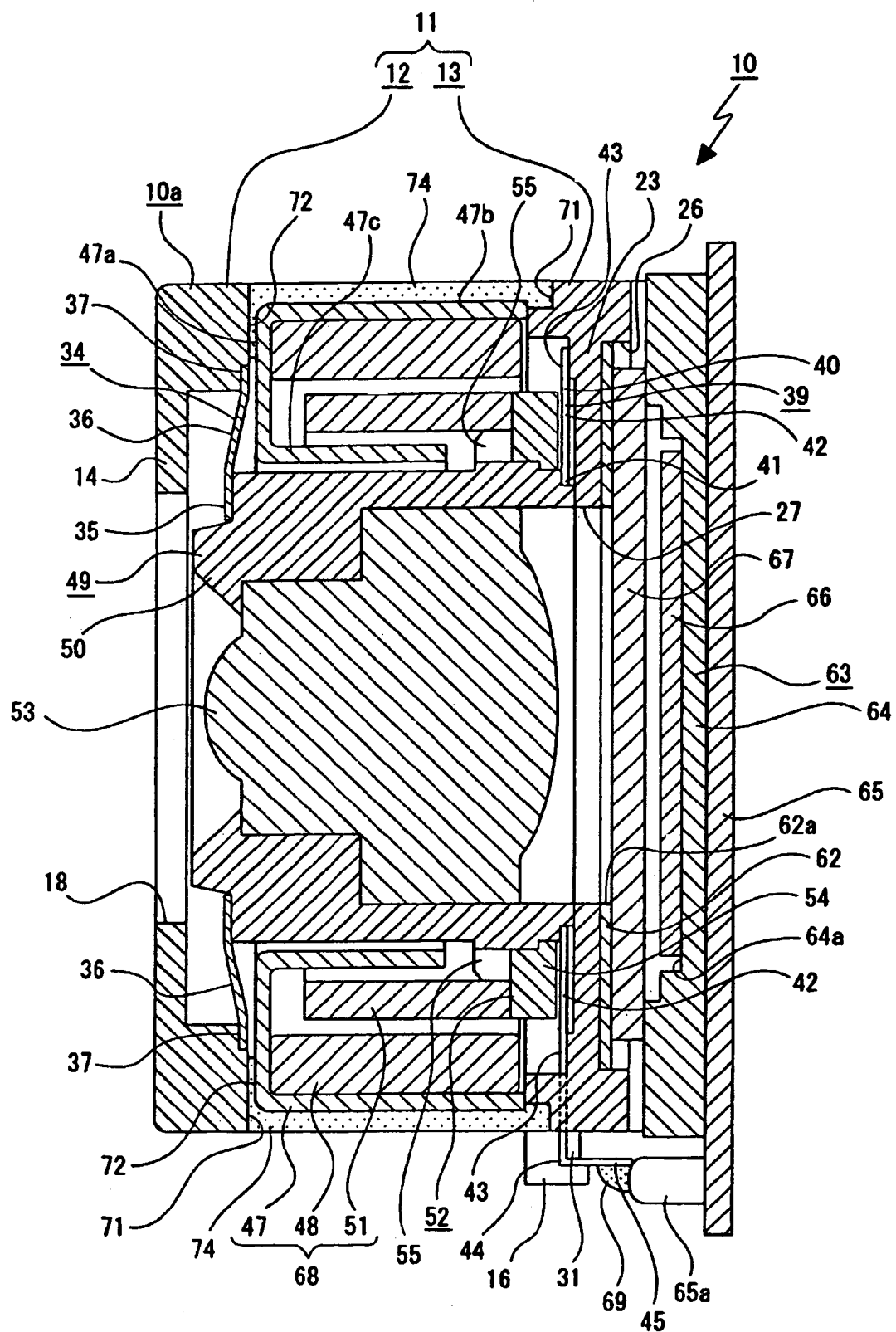
FIG. 6 is a schematic enlarged cross-sectional view of the imaging unit.

A yoke 47 is arranged inside of the lens barrel 11 (refer to FIGS. 3, 4, and 6). The yoke 47 is formed of a magnetic metal material, and is composed of a base section 47a formed into an annular shape, an outer peripheral section 47b protruded backward from an outer peripheral edge of the base section 47a, and an inner peripheral section 47c protruded backward from an inner peripheral edge of the base section 47a.

A driving magnet 48 is arranged inside of the yoke 47. In the driving magnet 48, a half portion on the outer peripheral side and a half portion on the inner peripheral side are magnetized so as to form different magnetic poles 48a, 48b, and for example, the magnetic pole 48a on the outer peripheral side is adapted to be an N pole, and the magnetic pole 48b on the inner peripheral side is adapted to be an S pole. The driving magnet 48 is attached to the yoke 47 in abutting contact with the base section 47a and the outer peripheral section 47b (refer to FIG. 6).

Inside of the lens barrel 11, a movable part 49 is arranged so movably in the optical axis direction. The movable part 49 is composed of a lens holder 50, a driving coil 51, a coil holder 52, and a lens block 53 held by the lens holder 50 (refer to FIGS. 3 and 4).

Figure 15:
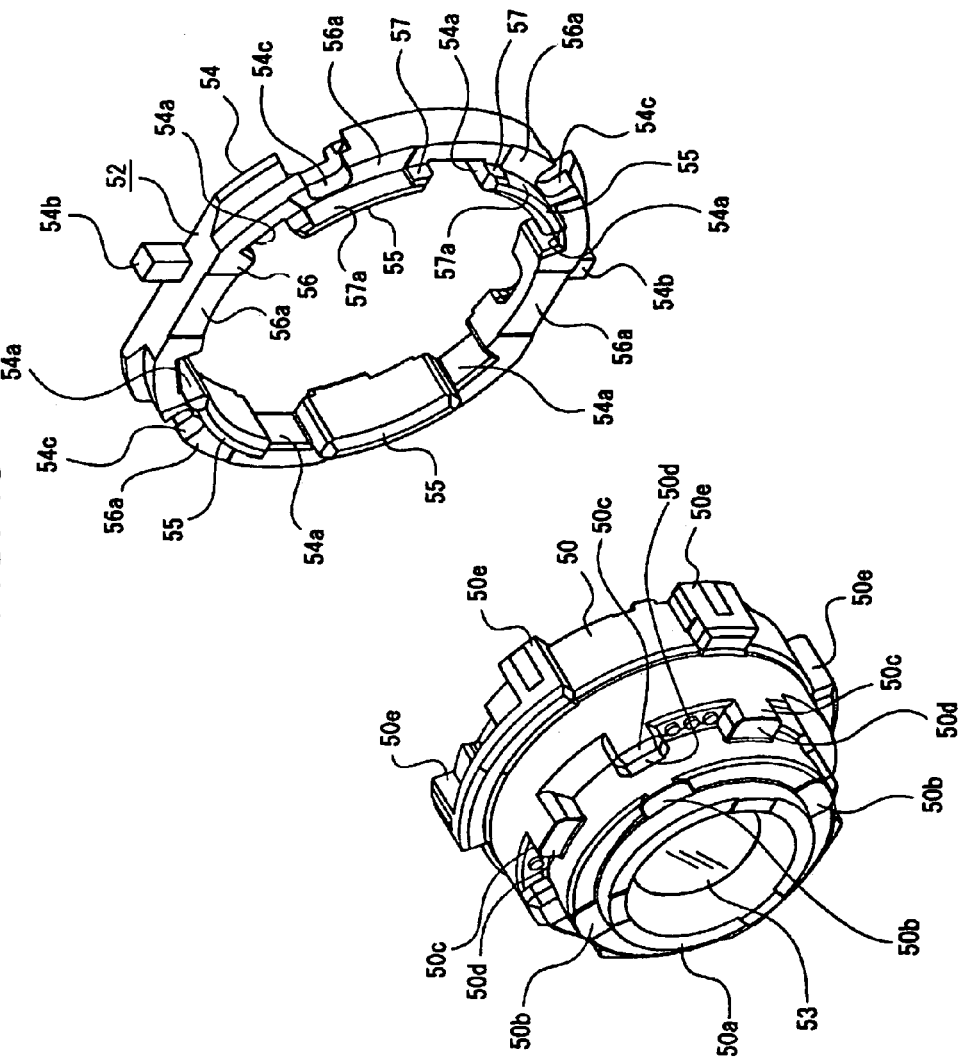
FIG. 15 is an enlarged exploded perspective view showing a lens holder holding a lens block and a coil holder.

The lens holder 50, as shown in FIG. 15, is formed into a substantially cylindrical shape, the axis direction of which coincides with the optical axis direction, and is provided with a positioning annular section 50a in a front end thereof. At positions closer to the front end of the lens holder 50, there are provided holding ribs 50b, 50b, . . . slightly projected forward so as to be spaced evenly in a circumferential direction. In the lens holder 50, regulated ribs 50c, 50c, . . . are provided so as to be spaced evenly in the circumferential direction at positions on the back side of the holding ribs 50b, 50b, . . . , and the front surfaces of the regulated ribs 50c, 50c, . . . are formed as regulated surface sections 50d, 50d, respectively.

Figure 16:
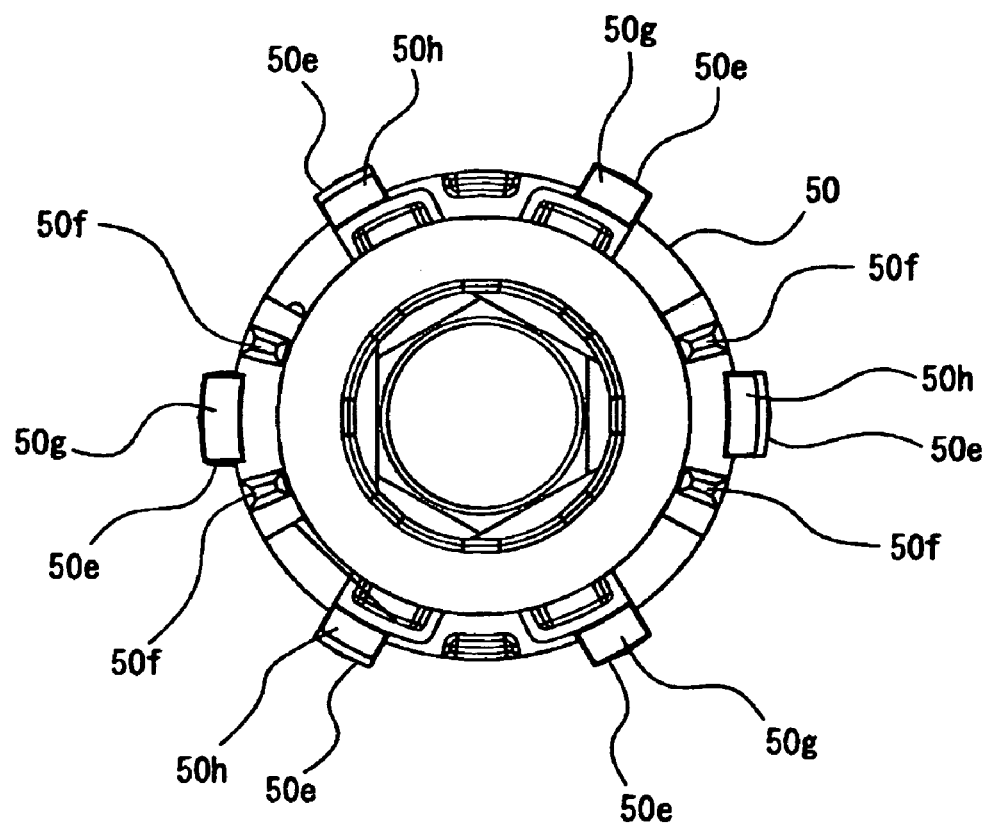
FIG. 16 is an enlarged back view of the lens holder.

Fitting projections 50e, 50e, . . . are provided separately in the circumferential direction in a back end portion of the lens holder 50. In an outer peripheral portion of a back surface of the lens holder 50, as shown in FIG. 16, four positioning projections 50f, 50f, . . . are provided separately in the circumferential direction.

In the back surface of the lens holder 50, three first regulated surface sections 50g, 50g, 50g and three second regulated surface sections 50h, 50h, 50h are provided, which are slightly projected backward so as to be separated in the circumferential direction, respectively. The first regulated surface sections 50g, 50g, 50g and the second regulated surface sections 50h, 50h, 50h are provided at positions spaced evenly in the circumferential direction, and the second regulated surface sections 50h, 50h, 50h are positioned between the first regulated surface sections 50g, 50g, 50g, respectively.

The backward projection amount of the first regulated surface sections 50g, 50g, 50g are a little larger than that of the second regulated surface sections 50h, 50h, 50h, and a difference in the projection amount between both is set to about 0.02 mm, for example.

Inside of the lens holder 50 are attached the lens block 53 having a plurality of movable lenses functioning as focus lenses, a fixed diaphragm, and the like (refer to FIGS. 3 and 6).

A driving coil 51 is formed by being wound into an annular shape, an outer diameter of which is smaller than that of the driving magnet 48 (refer to FIGS. 3, 4 and 6).

The coil holder 52 has a base section 54 formed into a substantially annular shape having a small thickness, and holding projections 55, 55, projected forward from an inner peripheral edge of the base section 54 (refer to FIG. 15).

In the base section 54, fitting depressions 54a, 54a, . . . are formed separately in a circumferential direction in an inner peripheral surface thereof. In both upper and lower end portions of the base section 54, coil winding projections 54b, 54b projected upward and downward, respectively, are provided. In the base section 54, adhesive applying notches 54c, 54c, . . . are formed separately in the circumferential direction, and the adhesive applying notches 54c, 54c, . . . are opened anteroposteriorly and outward.

A front surface of the base section 54 is formed as a first attachment surface 56 to which the driving coil 51 is attached. In the first attachment surface 56, shallow adhering depressions 56a, 56a, . . . are formed separately in the circumferential direction, which are formed at positions corresponding to the adhesive applying notches 54c, 54c, except for some of them.

The holding projections 55, 55, . . . are provided at positions corresponding to the adhering depressions 56a, 56a, . . . , respectively. An outer surface of the holding projections 55, 55, . . . is formed as a second attachment surface 57 to which the driving coil 51 is attached. In the second attachment surface 57, shallow adhering depressions 57a, 57a, are formed, which are formed so as to be continued to the adhering depressions 56a, 56a formed in the base section 54, respectively.

The movable part 49 is constructed by attaching to the coil holder 52 the driving coil 51 and the lens holder 50 with the lens block 53 attached (refer to FIG. 3).

The driving coil 51 is attached to the first attachment surface 56 and the second attachment surface 57 of the coil holder 52 by adhering. The attachment of the driving coil 51 to the coil holder 52 is performed as follows (refer to FIGS. 17 to 19).

Figure 17:
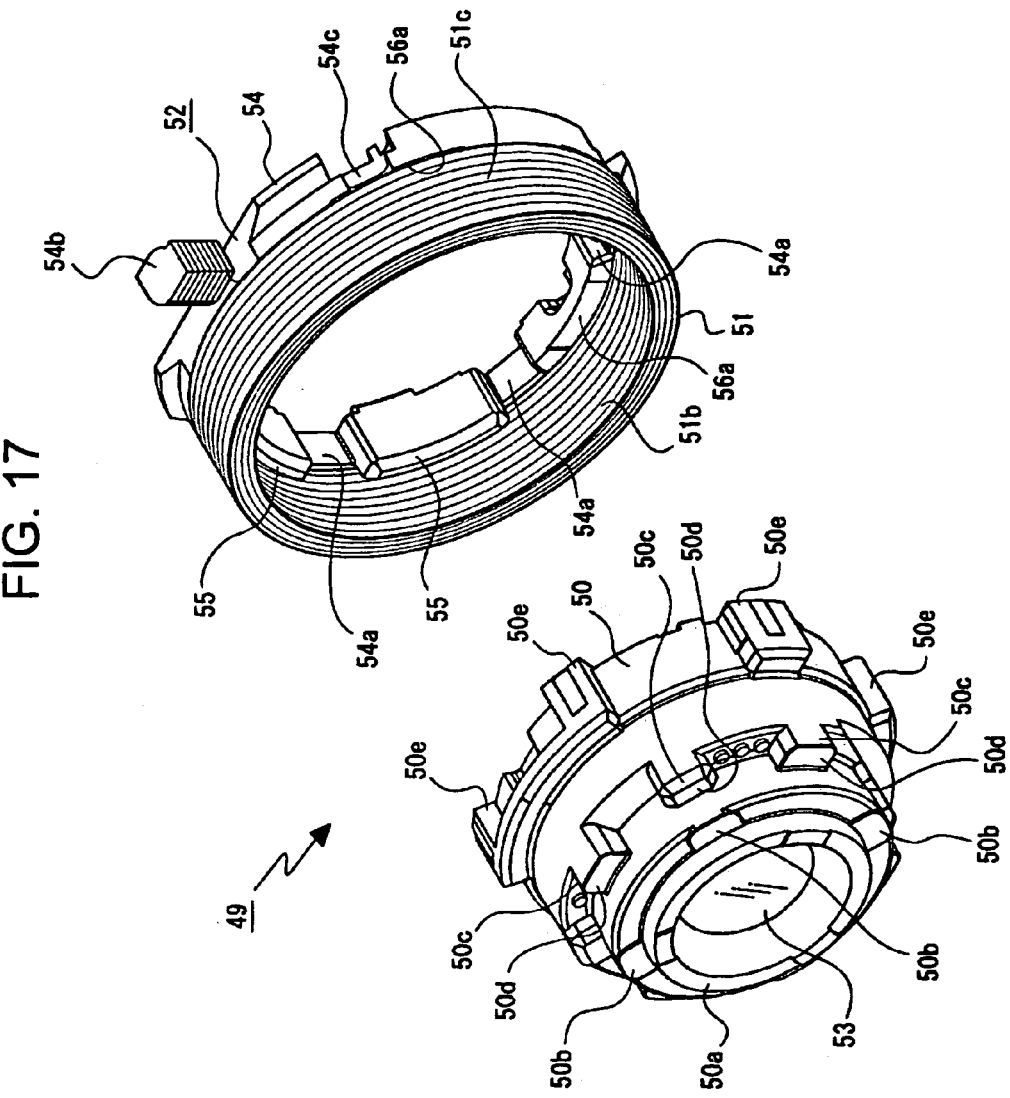
FIG. 17 is an enlarged exploded perspective view showing the lens holder and the coil holder with a driving coil attached.
Figure 18:
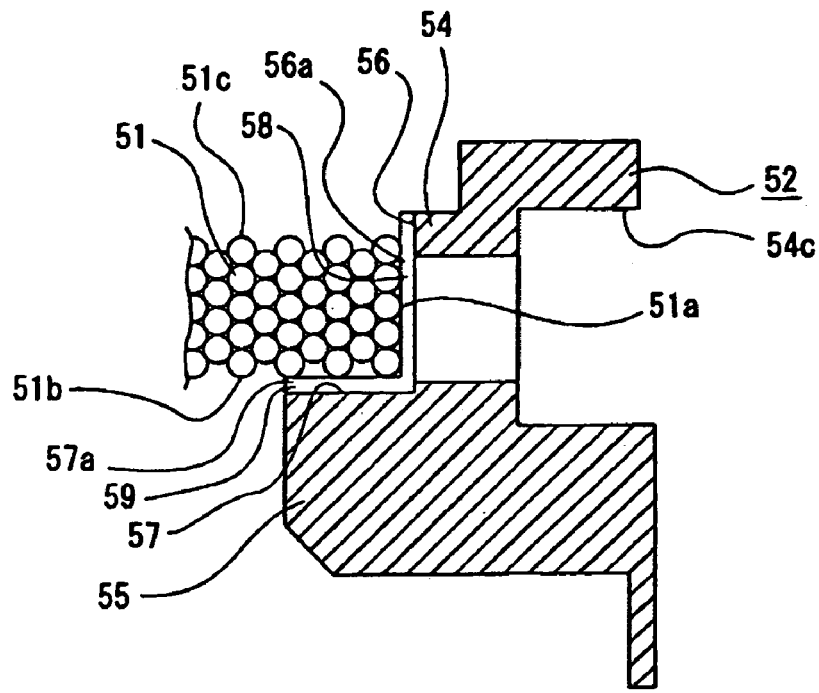
FIG. 18 is an enlarged cross-sectional view showing a state before the driving coil is made to adhere to the coil holder.

First, one end surface 51a in an axis direction of the driving coil 51 is made to abut against the first attachment surface 56 of the coil holder 52 to couple the driving coil 51 to the coil holder 52 (refer to FIG. 17). In the state where the one end surface 51a of the driving coil 51 abuts against the first attachment surface 56, an inner peripheral surface 51b of the driving coil 51 comes into contact with outer peripheral surfaces of the holding projections 55, 55, . . . . In this state, as shown in FIG. 18, clearances 58, 58, . . . are formed between the one end surface 51a of the driving coil 51 and the base section 54 by the adhering depression 56a, 56a, . . . formed in the first attachment surface 56, and clearances 59, 59, . . . are formed between the inner peripheral surface 51b of the driving coil 51 and the holding projections 55, 55, . . . by the adhering depressions 57a, 57a formed in the second attachment surface 57. At this time, part of the one end surface 51a of the driving coil 51 is located facing the adhesive applying notches 54c, 54c, . . . of the coil holder 52.

Figure 19:
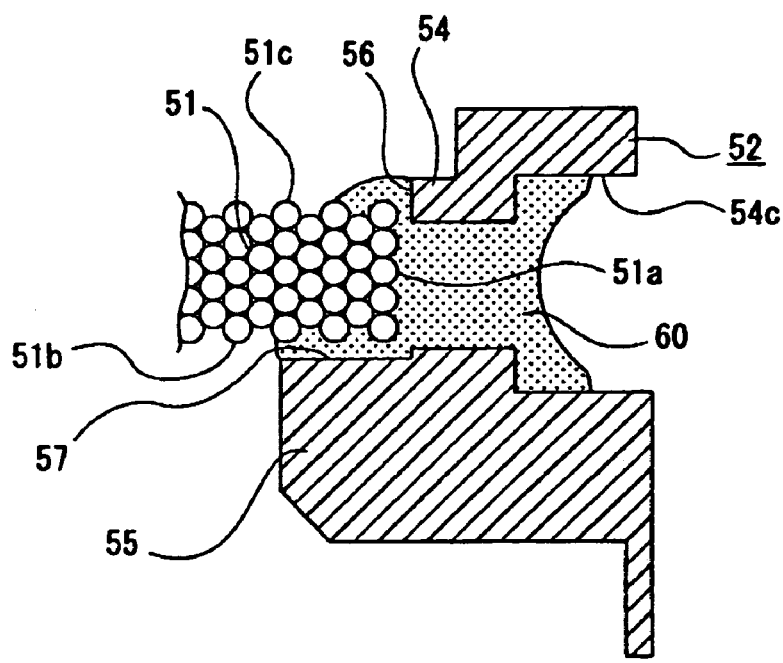
FIG. 19 is an enlarged cross-sectional view showing a state in which the driving coil is made to adhere to the coil holder.

Next, an adhesive 60 is filled into each of the adhesive applying notches 54c, 54c, . . . of the coil holder 52 (refer to FIG. 19).

The adhesives 60, 60, . . . filled into the adhesive applying notches 54c, 54c, . . . penetrate the clearances 58, 58, . . . , 59, 59, . . . to adhere to the one end surface 51a and the inner peripheral surface 51b of the driving coil 51. The adhesives 60, 60, . . . penetrating the clearances 58, 58, . . . further turn and reach the outer peripheral surface 51c side of the driving coil 51 to adhere to the outer peripheral surface 51c.

Subsequently, by curing the adhesives 60, 60, . . . , the driving coil 51 is fixed to the coil holder 52.

In the case where, for example, a thermosetting adhesive is used as the adhesives 60, 60, . . . , the driving coil 51 and the coil holder 52 are put into a heat-treating furnace, and heated for predetermined time, for example, about 30 minutes to cure the adhesives 60, 60, . . . .

The thermosetting adhesive is generally highly penetrative, and thus, in the case where the thermosetting adhesive is used as the adhesives 60, 60, . . . , the adhesives 60, 60, . . . advantageously run and reach the inner peripheral surface 51b and the outer peripheral surface 51c of the driving coil 51 with ease.

Moreover, in the case where, for example, a UV-curable adhesive is used as the adhesives 60, 60, . . . , ultraviolet is irradiated for predetermined time to cure the adhesives 60, 60, . . . .

Generally, the UV-curable adhesive will be cured after short time, for example, about 5 to 30 seconds by irradiating ultraviolet, and thus, in the case where the UV-curable adhesive is used as the adhesives 60, 60, . . . , time required for the assembling process of the imaging unit 10 including the lens unit 10a can be largely reduced by the shortened cure time.

As described above, in the imaging apparatus 1, since the two surfaces of the one end surface 51a and the inner peripheral surface 51b of the driving coil 51 are adhesively attached to the first attachment surface 56 and the second attachment surface 57 of the coil holder 52, which are angled with respect to each other, adhesive strength is high, and thus attachment strength of the driving coil 51 to the coil holder 52 is improved. Accordingly, even if large impact such as drop occurs, detachment of the driving coil 51 from the coil holder 52 can be prevented.

Furthermore, since in addition to the one end surface 51a and the inner peripheral surface 51b of the driving coil 51, the outer peripheral surface 51c also adheres to the coil holder 52 by the adhesives 60, 60, the attachment strength of the driving coil 51 to the coil holder 52 can be improved.

While in the above description, the example is described in which the holding projections 55, 55, . . . projected from the inner peripheral edge of the base section 54 of the coil holder 52 are provided to make the driving coil 51 adhere to the coil holder 52, on the contrary, holding projections projected from an outer peripheral edge of the base section 54 of the coil holder 52 may be provided to make the driving coil 51 adhere to coil holder 52. Alternatively, holding projections projected from both the inner peripheral edge and the outer peripheral edge of the base section 54 of the coil holder 52 may be provided to make the driving coil 51 to the coil holder 52.

Moreover, since the clearances 58, 58, . . . , 59, 59, . . . for making the adhesives 60, 60, . . . penetrate the first attachment surface 56 and the second attachment surface 57 of the coil holder 52 are formed, the adhesives 60, 60, . . . securely turn and reach the one end surface 51a and the inner peripheral surface 51b of the driving coil 51 to adhere, which can improve the reliability in the adhesion of the driving coil 51 to the coil holder 52.

Furthermore, since the adhesive applying notches 54c, 54c . . . for filling the adhesives 60, 60, . . . into the coil holder 52 are formed in the coil holder 52, filling work can be performed with ease.

Figure 20:
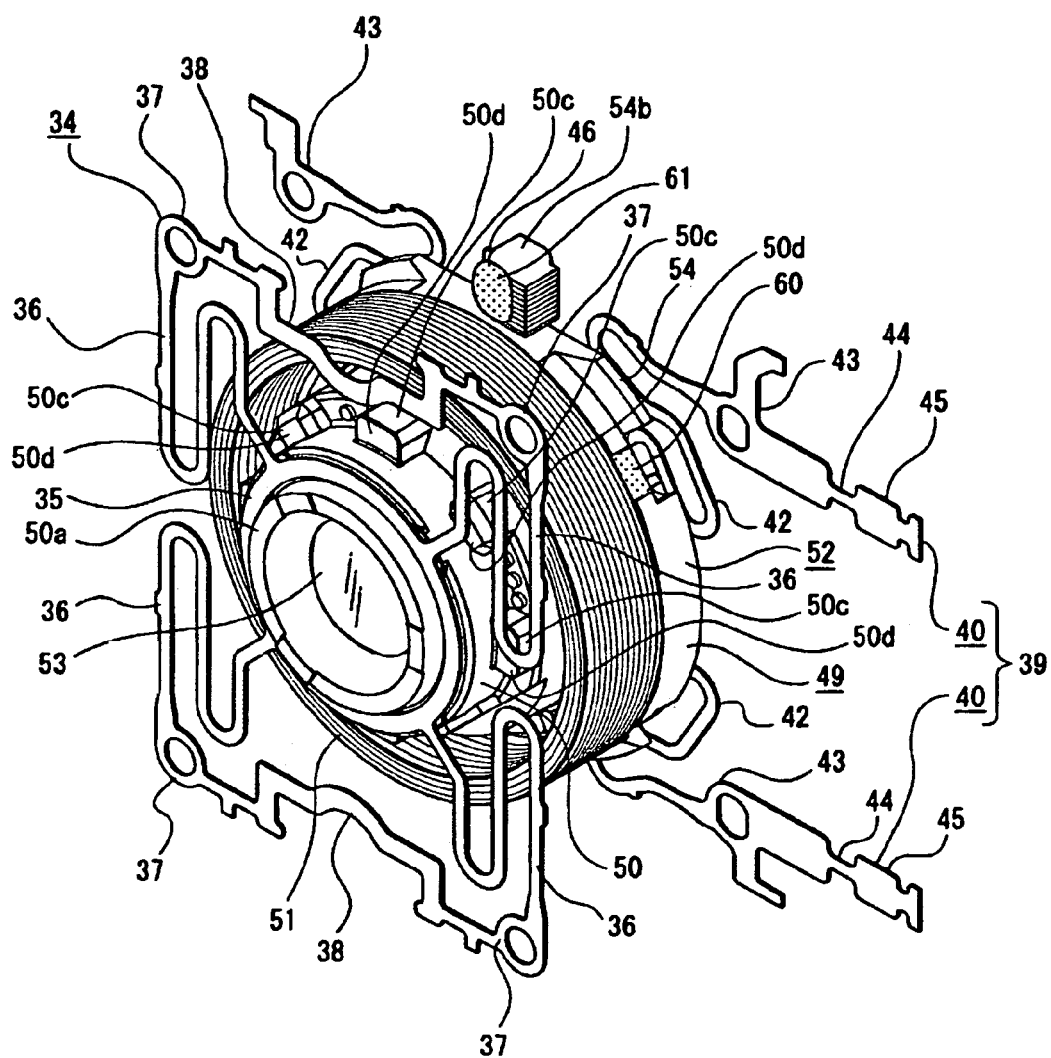
FIG. 20 is an enlarged perspective view showing a state where the first biasing plate spring and the second biasing plate spring are attached to a movable part.
Figure 21:
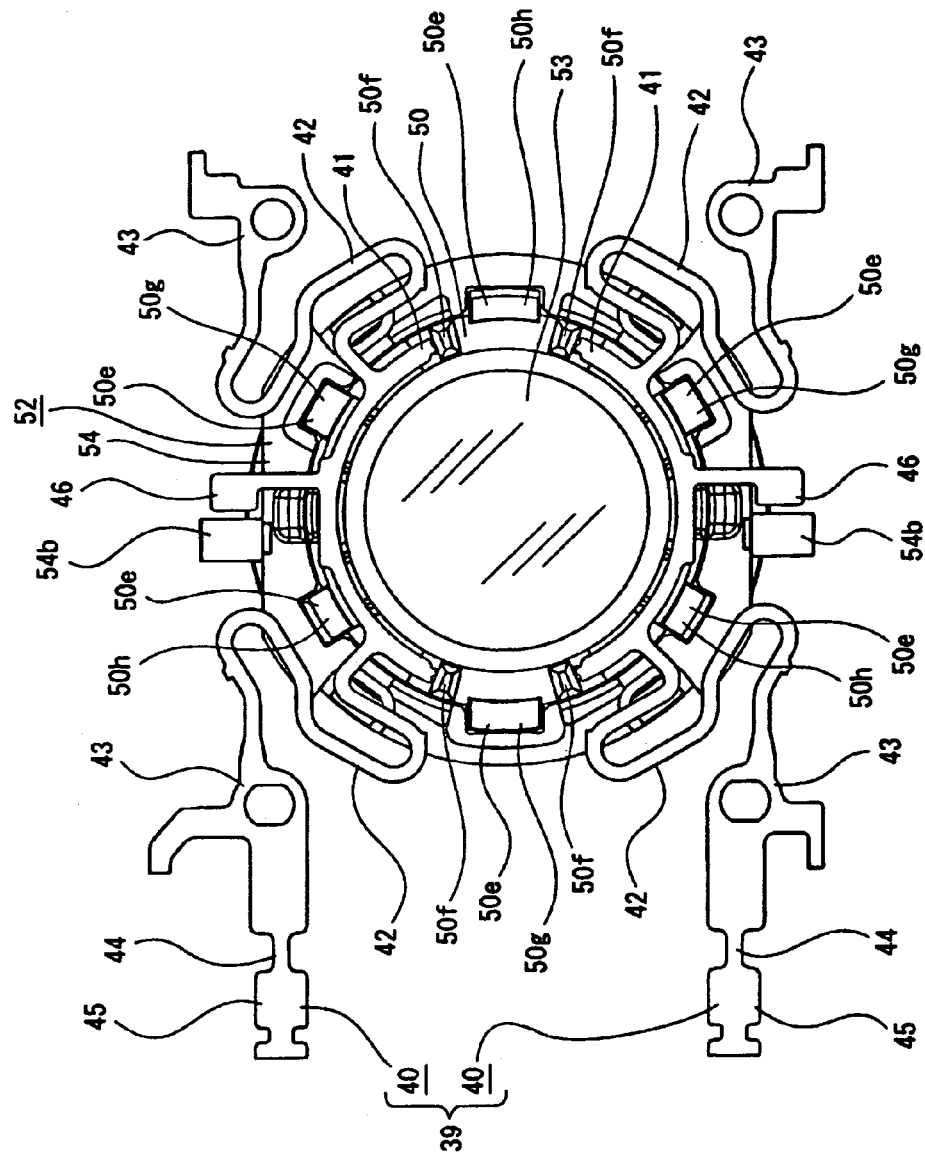
FIG. 21 is an enlarged back view showing a state where the second biasing plate spring is attached to the movable part.
Figure 22:
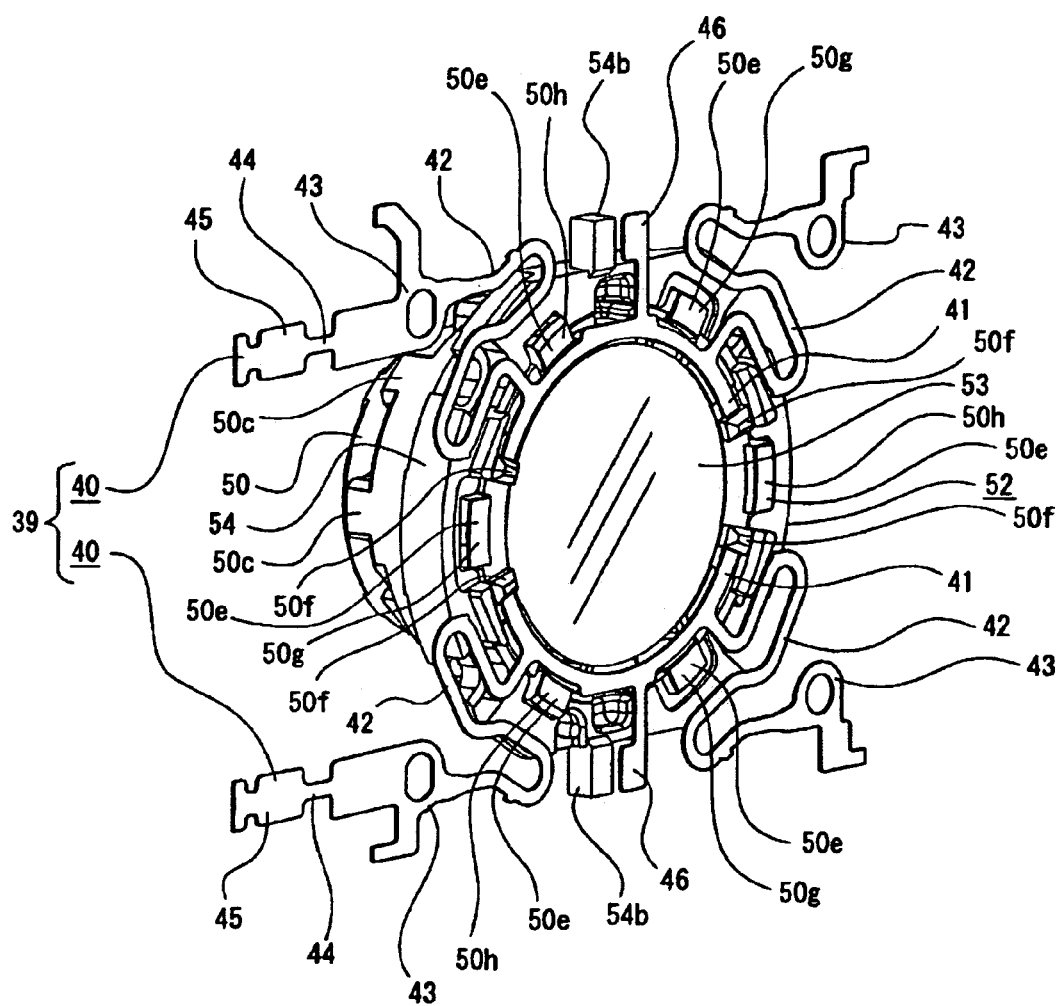
FIG. 22 is an enlarged perspective view showing the state where the second biasing plate spring is attached to the movable part with the driving coil omitted.

The movable part 49 is held by the holding section 35 of the first biasing plate spring 34 and the holding sections 41, 41 of the second biasing plate spring 39 (refer to FIGS. 20 to 22).

The holding section 35 of the first biasing plate spring 34, as shown in FIG. 20, is attached to the lens holder 50 by being externally fitted in the positioning annular section 50a and being brought into contact with front surfaces of the holding ribs 50b, 50b, . . . . The holding sections 41, 41 of the second biasing plate spring 39, as shown in FIGS. 21 and 22, are attached to the coil holder 52 by being arranged between the upper or lower positioning projections 50f, 50f, . . . in the back surface of the lens holder 50.

In the state where the second biasing plate spring 39 is attached to the lens holder 50, the coil connecting sections 46, 46 of the second biasing plate spring 39 are located adjacent to the coil winding projections 54b, 54b of the coil holder 52, respectively, and respective ends of the driving coil 51 wound around the coil winding projections 54b, 54b, and the coil connecting sections 46, 46 are connected by solders 61, 61.

A light shielding sheet 62, and an imaging part 63 are attached to the second member 13 (refer to FIGS. 3 and 4).

The light shielding sheet 62 has a through hole 62a in a central portion thereof, and is arranged in the arrangement depression 26 formed in the back surface 23a of the second member 13 to be attached (refer to FIG. 6).

The imaging part 63 is composed of an imaging casing 64, a control circuit substrate 65, an imaging element 66 and a cover 67.

In the imaging casing 64, a shallow depression 64a opened forward is formed, in which the imaging element 66 is arranged. As the imaging element 66, for example, a CCD (Charge Coupled Device) or a CMOS (Complementary Metal Oxide Semiconductor) is used.

The control circuit substrate 65 is a circuit substrate for controlling the imaging element 66 and supplying power to the driving coil 51, and in a right end portion thereof, connecting sections 65a, 65a projected forward are provided separately in the vertical direction (refer to FIGS. 3 and 4). The control circuit substrate 65 is attached to a back surface of the imaging casing 64, and when the control circuit substrate 65 is attached to the imaging casing 64, the positioning of the control circuit substrate 65 with respect to the second member 13 is performed by the positioning projections 28, 28, . . . provided in the second member 13.

The cover 67 is attached to a front surface of the imaging casing 64 to protect the imaging element 66.

The imaging part 63 is attached to the back surface 23a of the second member 13 with the light shielding sheet 62 arranged.

Hereinafter, the assembling procedure of the imaging unit 10 is described.

First, the second biasing plate spring 39 is assembled to the second member 13. The assembling of the second biasing plate spring 39 to the second member 13, as described above, is performed by inserting the crimp pins 30, 30, . . . of the second member 13 into the positioning holes 43a, 43a, 43b, 43b formed in the attached sections 43, 43, . . . of the respective spring members 40, 40 and crimping the crimp pins 30, 30, . . . At this time, parts of the folding sections 44, 44 and the connecting terminal sections 45, 45 of the second biasing plate spring 39 are projected laterally from the spring receiving sections 31, 31 of the second member 13, respectively.

Next, the movable part 49 is assembled to the second biasing plate spring 39. In the state where the movable part 49 is assembled to the second biasing plate spring 39, the movable part 49 is held by the holding sections 41, 41 of the second biasing plate spring 39, as described above.

Next, the yoke 47 with the driving magnet 48 attached is assembled to the second member 13. The yoke 47 is assembled so as to be fitted inside of the second member 13. The yoke 47 is arranged in the state where a back end surface thereof abuts against predetermined portions of an inner surface of the second member 13 (refer to FIG. 6). In the state where the yoke 47 is assembled to the second member 13, the driving coil 51 is located between the inner peripheral section 47c of the yoke 47 and the driving magnet 48.

In this manner, by arranging the driving coil 51 between the inner peripheral section 47c of the yoke 47 and the driving magnet 48, a linear actuator 68 is made up of the yoke 47, the driving magnet 48 and the driving coil 51 (refer to FIG. 6).

Subsequently, the first biasing plate spring 34 is assembled to the movable part 49. The assembling of the first biasing plate spring 34 to the movable part 49, as described above, is performed by externally fitting the holding section 35 into the positioning annular section 50a. In the state where the first biasing plate spring 34 is assembled to the movable part 49, the positioning pins 32, 32, . . . of the second member 13 are inserted into the attached holes 37a, 37a, . . . of the attached sections 37, 37, . . . of the first biasing plate spring 34, respectively.

Next, the first member 12 is assembled to the second member 13 to couple the first member 12 and the second member 13. The assembling of the first member 12 to the second member 13 is performed by sliding the first member 12 backward with respect to second member 13. At this time, the guided grooves 21, 21, . . . formed in the projecting sections 15, 15, . . . of the first member 12 are guided by the guiding projections 33, 33, . . . provided in the projecting sections 24, 24, of the second member 13, respectively, which allows smooth and secure coupling of both.

Figure 24:
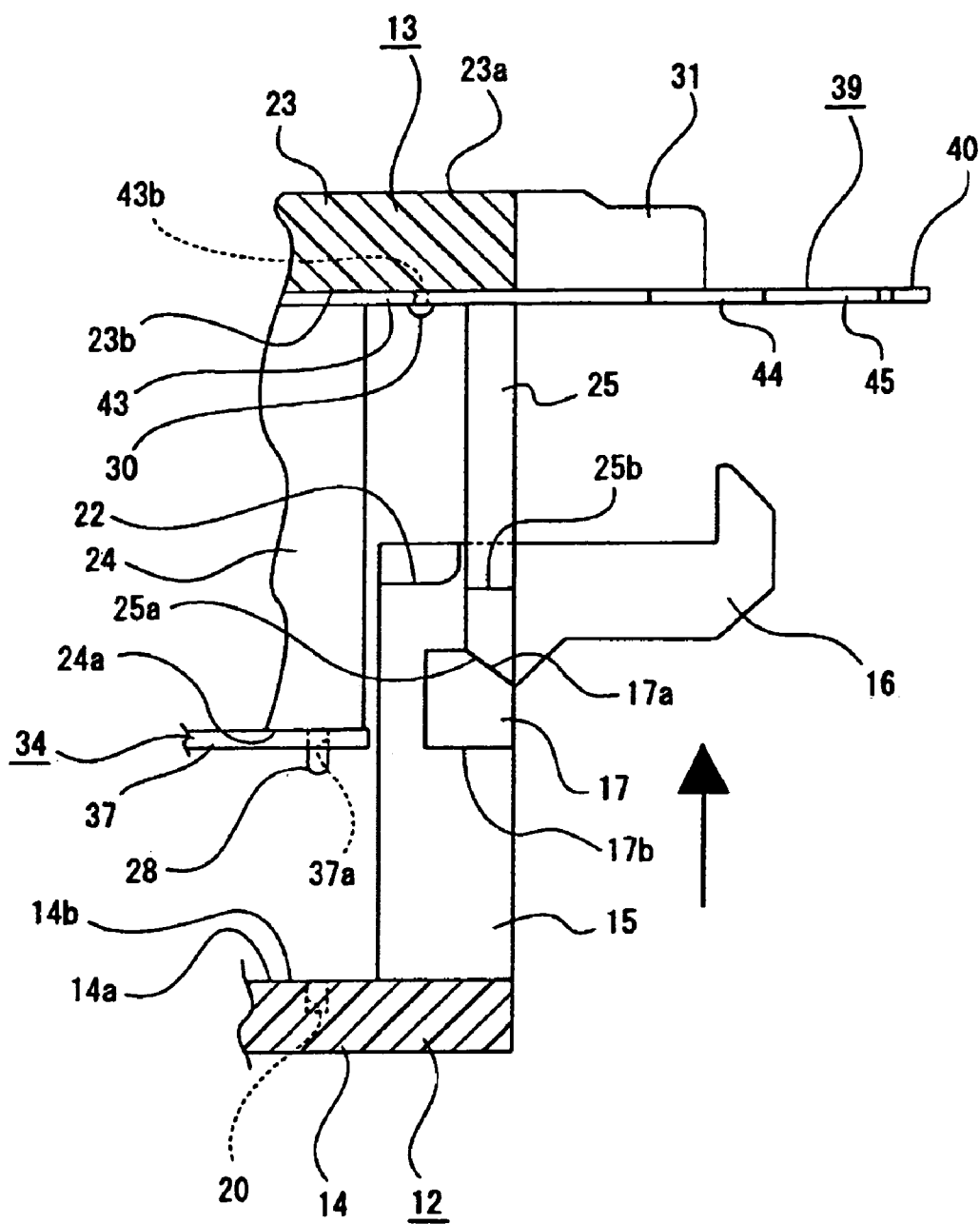
FIG. 24 shows a state when the first member and the second member are coupled together with FIGS. 25 to 27, and is an enlarged cross-sectional view showing a state where the first member is slid with respect to the second member and inclined surfaces of respective fixing pieces are brought into contact with each other.

When the first member 12 is slid with respect to the second member 13, the inclined surfaces 17a, 17a, . . . of the fixing pieces 17, 17, . . . of the first member 12 and the inclined surfaces 25a, 25a, . . . of the fixing pieces 25, 25, . . . of the second member 13 makes contact in the middle of sliding (refer to FIG. 24).

Figure 25:
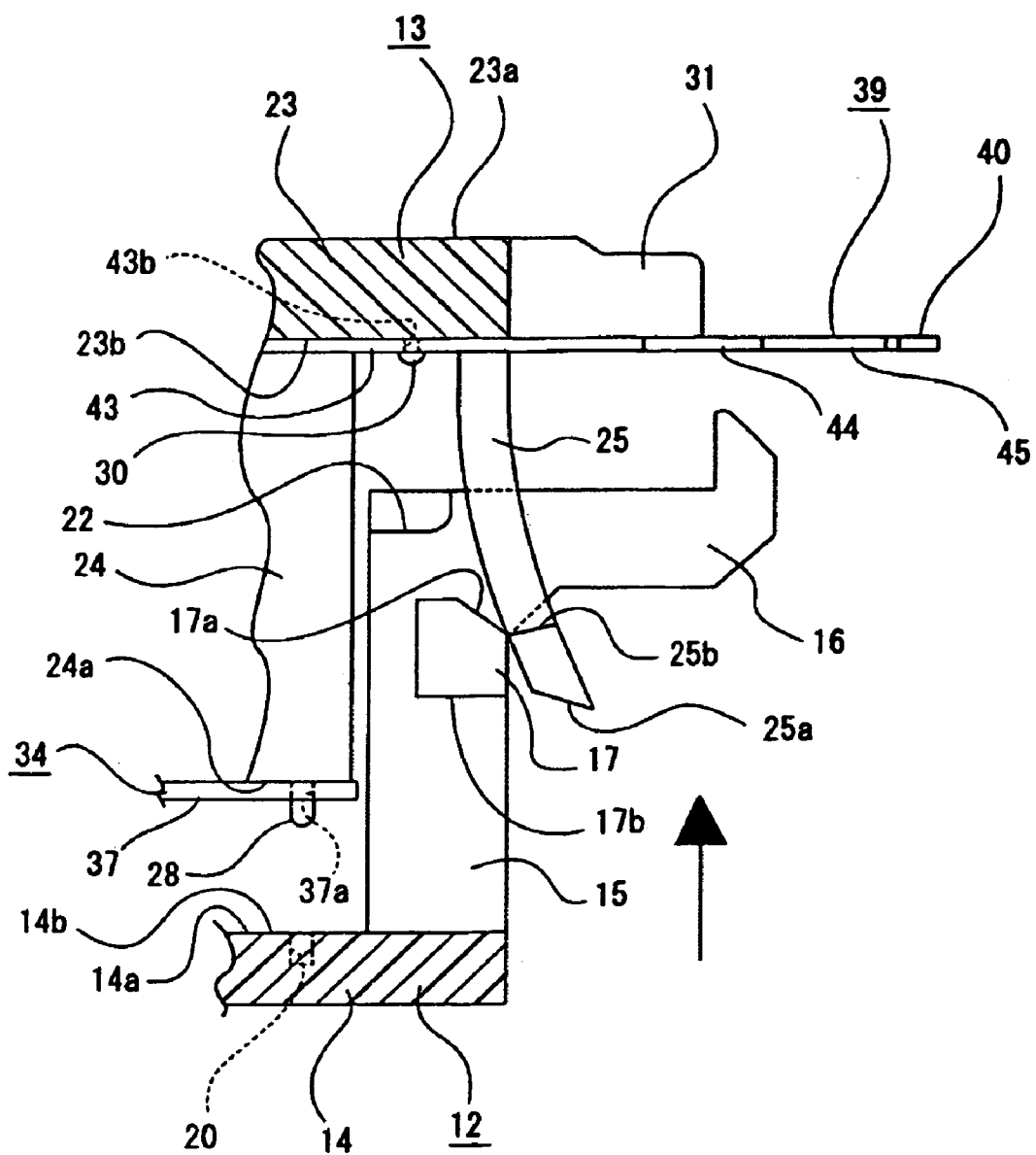
FIG. 25 is, subsequent to FIG. 24, an enlarged cross-sectional view showing a state where the first member is further slid with respect to the second member, and the fixing piece of the second member is resiliently deformed.

As the first member 12 is further slid with respect to the second member 13, the fixing pieces 17, 17, . . . and the fixing pieces 25, 25, . . . come into sliding contact, and the inclined surfaces 25a, 25a, . . . run on the inclined surfaces 17a, 17a, . . . , respectively, so that the fixing pieces 25, 25, . . . become resiliently deformed and deflected outward, as shown in FIG. 25.

Figure 26:
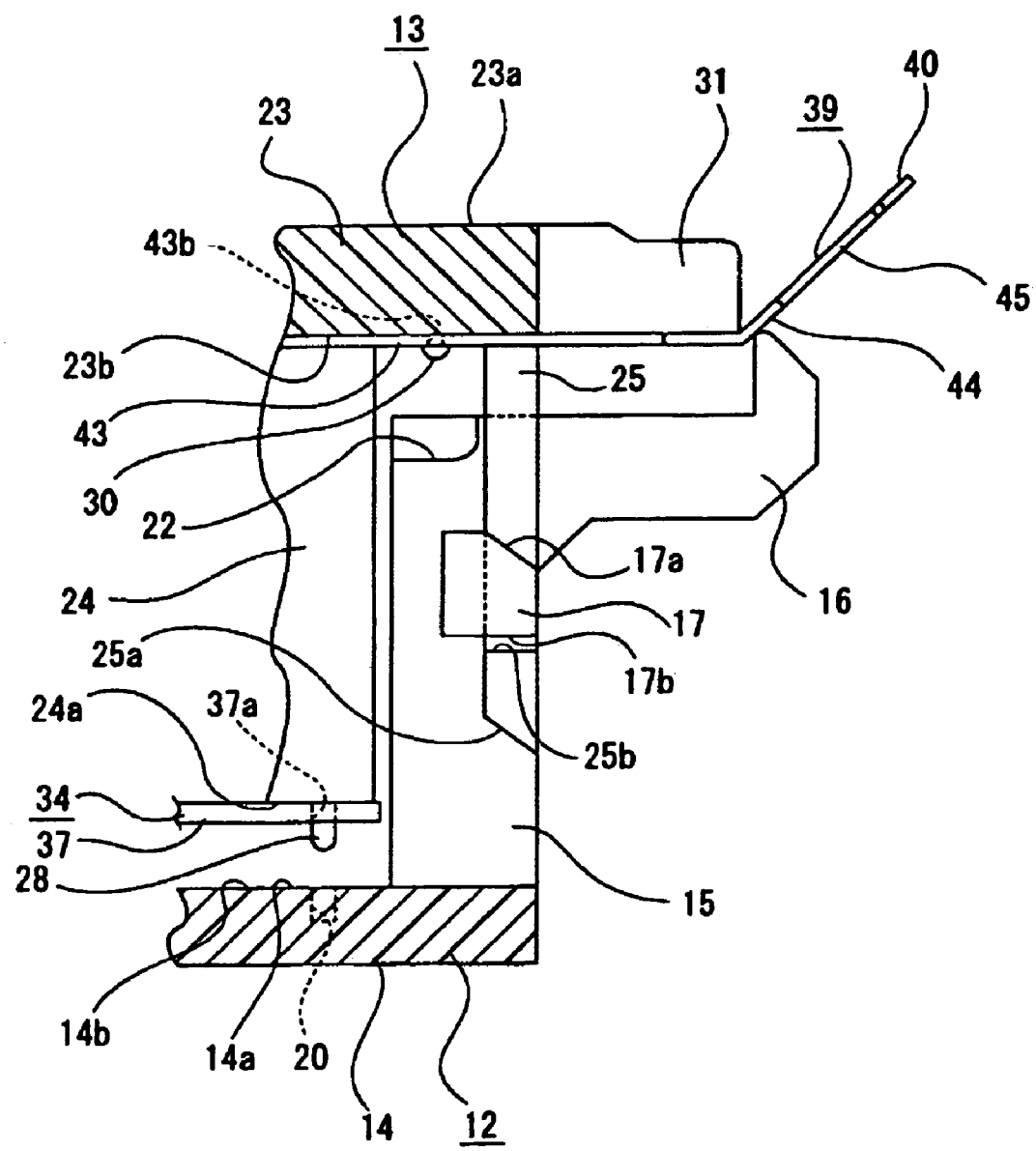
FIG. 26 is, subsequent to FIG. 25, an enlarged cross-sectional view showing a state where the first member is further slid with respect to the second member, and the fixing piece of the second member, which was deformed resiliently, resiliently returns to an original state.

As the first member 12 is still further slid with respect to the second member 13, the sliding contact state of the fixing pieces 17, 17, . . . and the fixing pieces 25, 25, . . . is released, so that the fixing pieces 25, 25, . . . deflected outward are restored resiliently and return to the original state, as shown in FIG. 26.

Figure 27:
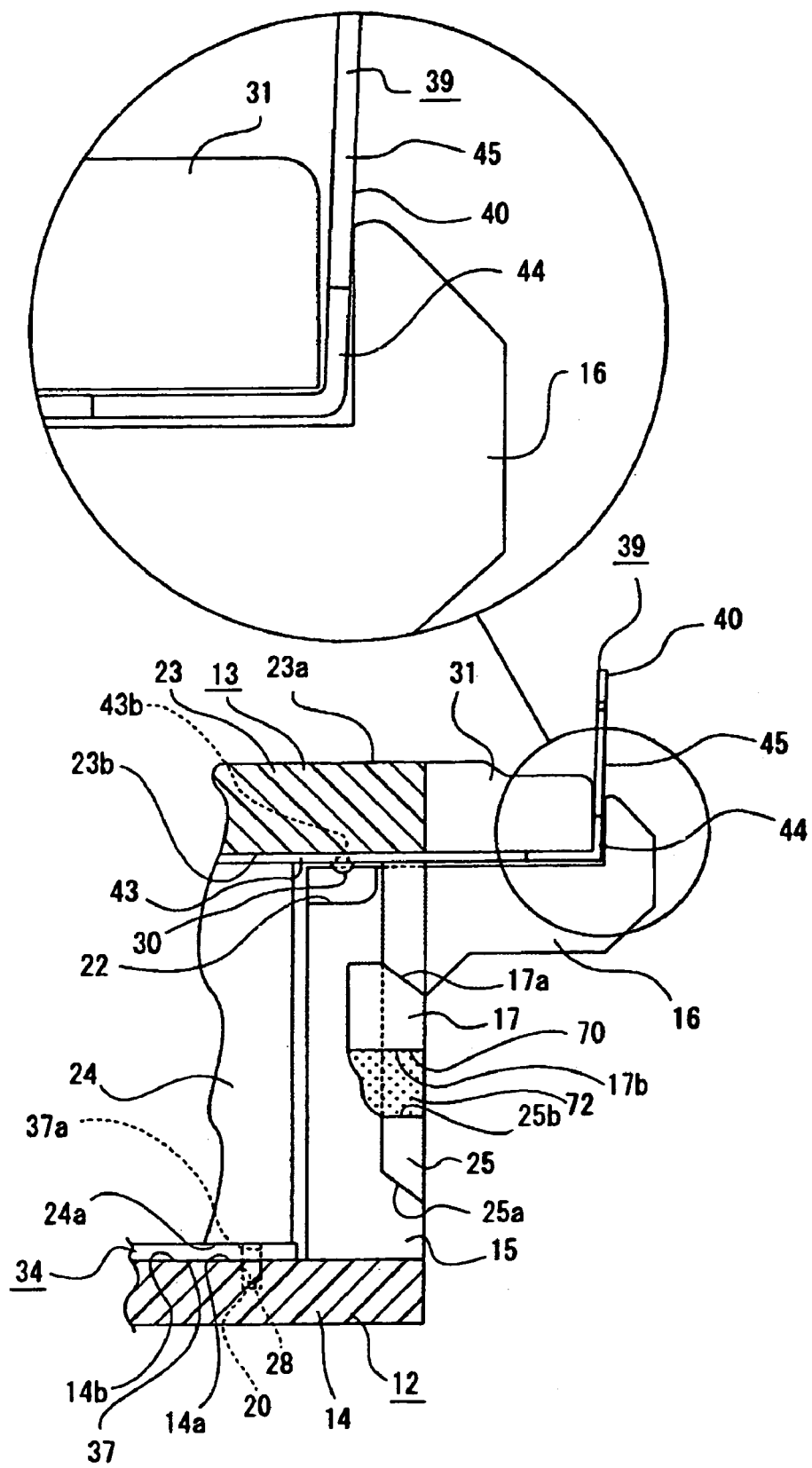
FIG. 27 is, subsequent to FIG. 26, an enlarged cross-sectional view showing a state where the first member is further slid with respect to the second member, and the first member and the second member are coupled.

As the first member 12 is yet further slid with respect to the second member 13, the connecting terminal sections 45, 45 of the second biasing plate spring 39 are pressed backward by the spring folding sections 16, 16, . . . of the first member 12, respectively, and the folding sections 44, 44, parts of which are received by the spring receiving sections 31, 31 of the second member 13, are bent, and the connecting terminal 45, 45 are folded at a substantially right angle, as shown in FIG. 27.

Figure 23:
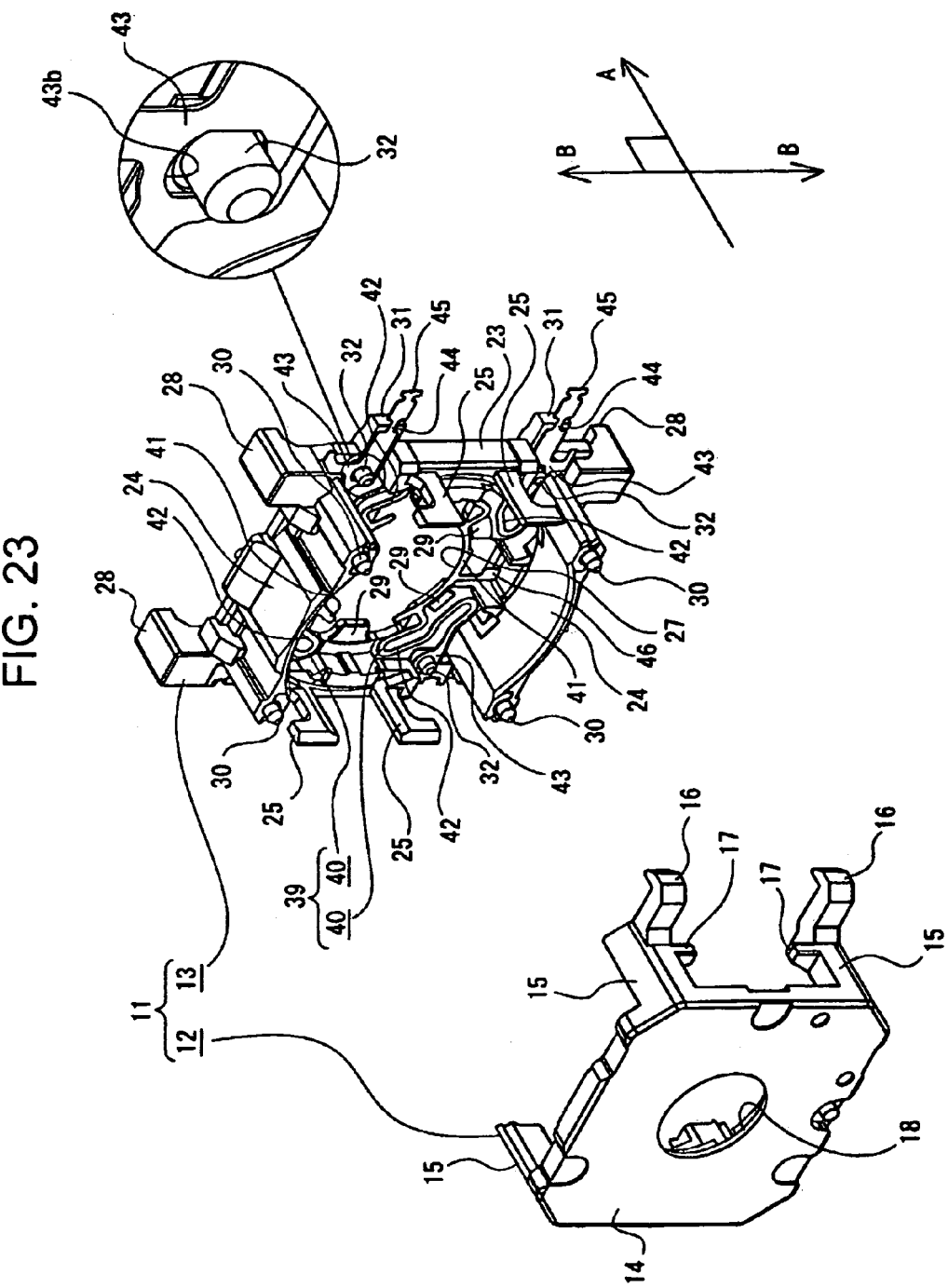
FIG. 23 is an enlarged perspective view showing the first member and the second member with the second biasing plate spring coupled.

At this time, in the second biasing plate spring 39, the positioning holes 43b, 43b are formed long in a direction (direction B indicated in FIG. 23) perpendicular to a folding direction (direction A indicated in FIG. 23) of the connecting terminals 45, 45, respectively (refer to an enlarged view in FIG. 23). Accordingly, since the positioning holes 43b, 43b are not formed long in the same direction as the folding direction of the connecting terminal sections 45, 45, respectively, when the connecting terminal sections 45, 45 are folded, the second biasing plate spring 39 positioned in the second member 13 is not displaced so as to move laterally with this folding, so that the displacement of the second biasing plate spring 39 with respect to the second member 13 can be prevented.

In the state where the connecting terminals 45, 45 are folded at a substantially right angle, bent sections of the folding sections 44, 44 are slightly rounded (refer to an enlarged view of FIG. 27), so that the folding sections 44, 44 are prevented from being folded down and cut.

As shown in FIG. 27, the spring holding surfaces 24a, 24a, . . . formed in the projecting sections 24, 24 of the second member 13 are made to abut against the back surface of the first biasing plate spring 34 attached to the movable part 49, and the front surface of the first biasing plate spring 34 is made to abut against the spring holding surfaces 14b, 14b, . . . formed in the base surface section 14 of the first member 12, by which the sliding of the first member 12 with respect to the second member 13 is completed.

At this time, the positioning pins 32, 32, . . . of the second member 13 are inserted into the attached holes 37a, 37a, . . . of the first biasing plate spring 34, respectively, and further inserted into the positioning holes 20, 20, . . . of the first member 12.

The attached sections 37, 37, . . . are held between the spring holding surfaces 14b, 14b, . . . of the first member 12 and the spring holding surfaces 24a, 24a, . . . of the second member 13 respectively, so that the first biasing plate spring 34 is attached to the lens barrel 11.

Thus, since the attached sections 37, 37, . . . of the first biasing plate spring 34 are held between the spring holding surfaces 14b, 14b, . . . and the spring holding surfaces 24a, 24a, . . . so that the first biasing plate spring 34 is fixed to the lens barrel 11, an additional process such as adhesion for fixing the first biasing plate spring 34 to the lens barrel 11 is not necessary, which can improve the workability in assembling process of the imaging unit 10 including the lens unit 10a.

It can be also considered that the fixing of the first biasing plate spring 34 and the second biasing plate spring 39 to the lens barrel 11 is performed, for example, in such a manner that the first biasing plate spring 34 and the second biasing plate spring 39 are simultaneously held between predetermined portions of the first member 12 and predetermined portions of the second member 13 in the state where the first member 12 and the second member 13 are coupled. In this case, however, there is a possibility that the fixing state of the first biasing plate spring 34 or the second biasing plate spring 39 becomes unstable due to dimension error on processing of the first member 12 and the second member 13 or assembling error of both.

Accordingly, as described above, the attached sections 37, 37, . . . of the first biasing plate spring 34 are held between the spring holding surfaces 14b, 14b, . . . and the spring holding surfaces 24a, 24a, . . . so that the first biasing plate spring 34 is fixed to the lens barrel 11, and the second biasing plate spring 39 is crimped by the crimp pins 30, 30, . . . to be fixed to the lens barrel 11, which can stabilize the fixing state of the first biasing plate spring 34 and the second biasing plate spring 39 to the lens barrel 11, regardless of dimension error on processing of the first member 12 and the second member 13 and assembling error of both.

As described above, in the state where the first member 12 and the second member 13 are coupled to make up the lens barrel 11, as shown in FIG. 27, tip surfaces of the projecting sections 15, 15, . . . of the first member 12 are located close to the attached sections 43, 43, . . . of the second biasing plate spring 39, respectively, and the crimp pins 30, 30, . . . which have been crimped, are located within the escape depressions 22, 22, . . . formed in the tip portions of the projecting sections 15, 15, . . . Accordingly, the interference of the crimp pins 30, 30, . . . and the projecting sections 15, 15, . . . is avoided.

While in the foregoing, the example is described in which the crimp pins 30, 30, . . . are provided in the second member 13 to fix the second biasing plate spring 39 to the second member 13, and the spring holding surfaces 14b, 14b, . . . and the spring holding surfaces 24a, 24a, . . . are formed in the first member 12 and the second member 13, respectively to fix the first biasing plate spring 34, on the contrary, crimp pins may be provided in the first member 12 to fix the first biasing plate spring 34 to the first member 12, and spring holding surfaces may be formed in the first member 12 and the second member 13, respectively to fix the second biasing plate spring 39.

Next, the light shielding sheet 62 and the imaging part 63 are attached to the second member 13. In the state where the imaging part 63 is attached to the second member 13, tip portions of the connecting sections 65a, 65a of the control circuit substrate 65 are located in contact with or close to the connecting terminal sections 45, 45, of the second biasing plate spring 39, respectively.

As described above, in the imaging apparatus 1, the spring folding sections 16, 16, and the spring receiving sections 31, 31 for folding the connecting terminal sections 45, 45 in the direction approaching the connecting sections 65a, 65a when the first member 12 and the second member 13 are coupled are provided, which eliminates folding work for folding the connecting terminals 45, 45 in the direction approaching the connection sections 65a, 65a, respectively, aside from the coupling work of the first member 12 and the second member 13, so that the workability in the assembling work of the imaging apparatus 1 can be improved.

Furthermore, since the width of the folding sections 44, 44 is smaller than the width of the adjacent attached sections 43, 43 and connecting terminal sections 45, 45, the folding sections 44, 44 are easily bent, and when the first member 12 and the second member 13 are coupled, the folding sections 44, 44 can be securely bent by small force to fold the connecting terminal sections 45, 45.

Furthermore, since the folding sections 44, 44 are formed into a straight line extending in the direction in which the attached sections 43, 43 and the connecting terminal sections 45, 45 are jointed and having a constant width, stress concentration is hardly caused in the bent sections during bending, which can prevent the folding sections 44, 44 from being cut.

Next, the connecting sections 65a, 65a of the imaging part 63 attached to the second member 13 and the connecting terminal sections 45, 45 of the second biasing plate spring 39 are connected by the solders 69, 69, respectively.

Figure 5:
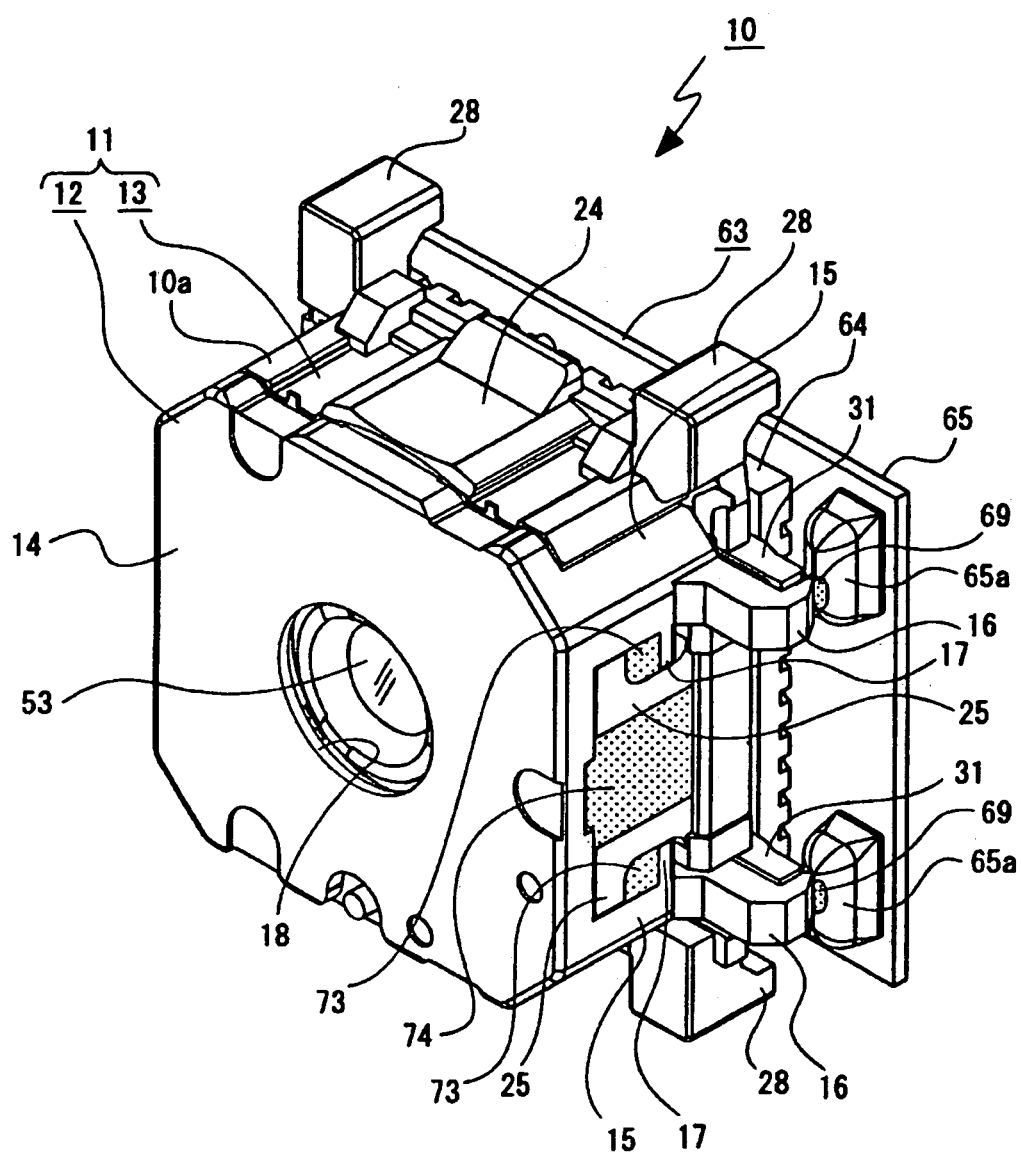
FIG. 5 is an enlarged perspective view of the imaging unit.
Figure 28:
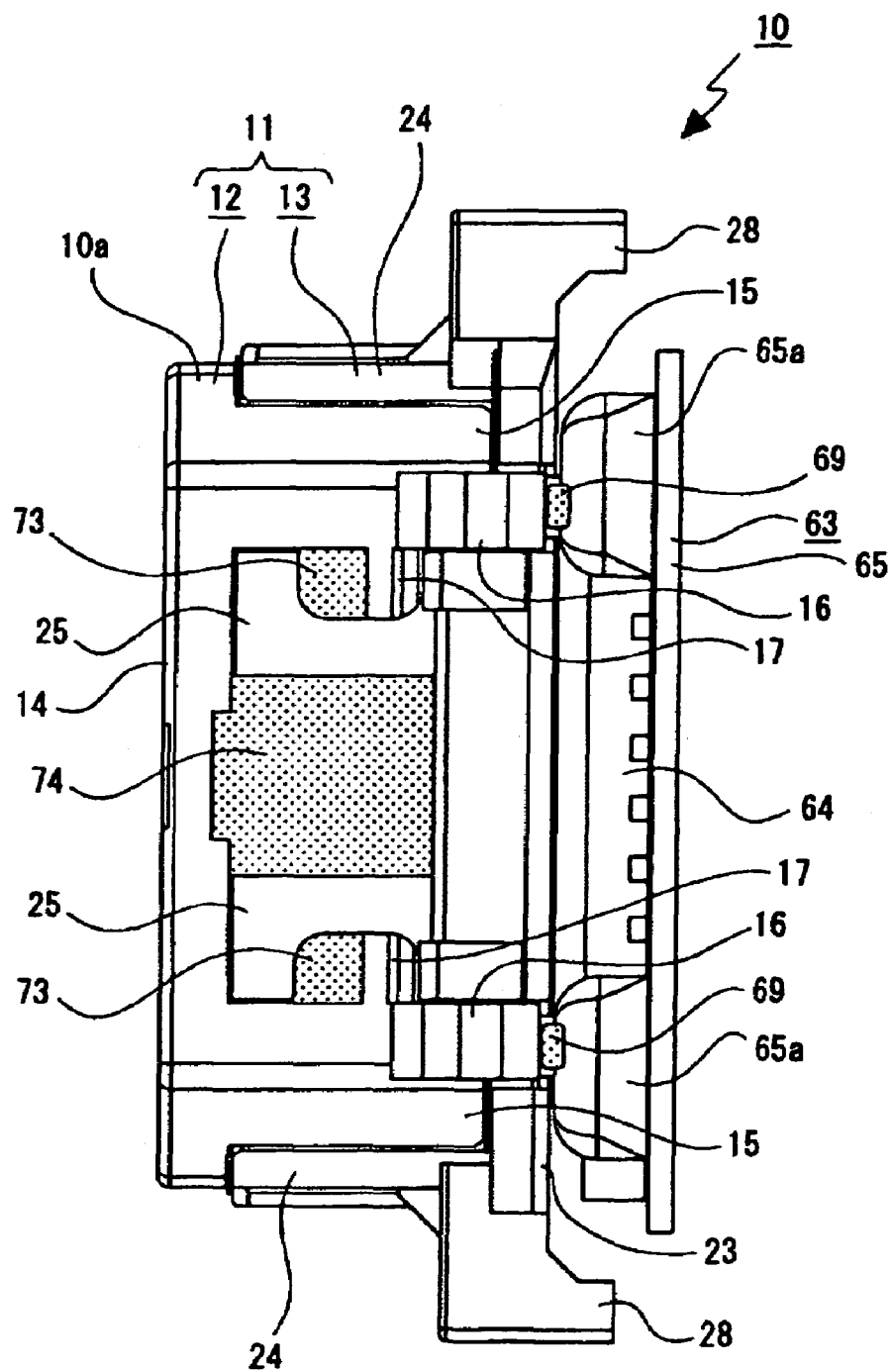
FIG. 28 is an enlarged side view of the imaging unit.

As described above, in the state where the first member 12 is slid with respect to the second member 13 to be coupled, as shown in FIGS. 5 and 28, the fixing pieces 17, 17, . . . of the first member 12 are located posterior to the fixing pieces 25, 25, . . . of the second member 13, and the opposed surfaces 17b, 17b, . . . formed in the front ends of the fixing pieces 17, 17, . . . and the opposed surfaces 25b, 25b, . . . formed in the back ends of the fixing pieces 25, 25, . . . are located so as to be opposed to each other.

First fixing spaces 70, 70, . . . are formed between the fixing pieces 17, 17, . . . of the first member 12 and the fixing pieces 25, 25, . . . of the second member 13, as shown in FIG. 27, and second fixing spaces 71, 71 are formed between the fixing pieces 25, 25, . . . , which are located vertically. The outer peripheral section 47b of the yoke 47 is located at positions corresponding the second fixing spaces 71, 71 (refer to FIG. 6).

Moreover, in the state where the first member 12 and the second member 13 are coupled, predetermined clearances 72, 72 are formed between the back surface 14a of the base surface section 14 of the first member 12 and the base section 47a of the yoke 47, and the clearances 72, 72 are communicated to the second fixing spaces 71, 71 (refer to FIG. 6).

For example, adhesives 73, 73 are filled, as fixing means, into the first fixing spaces 70, 70, . . . formed in the lens barrel 11. The adhesives 73, 73, . . . serves as the fixing means for fixing the first member 12 and the second member 13. The adhesives 73, 73, . . . are a UV-curable adhesive, for example.

Adhesives 74, 74 are filled into the second fixing spaces 71, 71 formed in the lens barrel 11, respectively. The adhesives 74, 74 are, for example, a UV-curable adhesive.

By curing the adhesives 73, 73, . . . filled into the first fixing spaces 70. 70, . . . , the first member 12 and the second member 13 are fixed.

The adhesives 74, 74 filled into the second fixing spaces 71, 71 also penetrate the clearances 72, 72 formed between the back surface 14a of the base surface section 14 and the base section 47a of the yoke 47, from the second fixing spaces 71, 71. By curing the adhesives 74, 74 in the second fixing spaces 71, 71, the three of the first member 12, the second member 13, and the yoke 47 adhere to be fixed (refer to FIG. 6). Moreover, by curing the adhesives 74, 74 in the clearances 72, 72, the first member 12 and the yoke 47 adhere to be fixed.

As described above, in the lens unit 10a, the adhesives 73, 73, . . . applied to the first fixing spaces 70, 70, . . . allow the first member 12 and the second member 13 to adhere. At this time, a direction in which the coupling of the first member 12 and the second member 13 is released is the direction in which the fixing pieces 17, 17, . . . located in the back are moved forward, and is the direction in which the fixing pieces 25, 25, . . . located in front are moved backward, and thus, it is a direction in which the adhesives 73, 73, . . . are compressed by the fixing pieces 17, 17, . . . and the fixing pieces 25, 25, . . . .

Accordingly, for example, even if large impact is caused by drop of the imaging apparatus 1 or the like, the adhesives 73, 73 are hardly detached from the fixing pieces 17, 17, . . . 25, 25, . . . , and the coupling state of the first member 12 and the second member 13 is stabilized, so that variation resistance and dropping impact resistance can be improved.

Furthermore, since the adhesion surfaces of the fixing pieces 17, 17, . . . , 25, 25, . . . are the opposed surfaces 17b, 17b, . . . 25b, 25b, . . . which are opposed in the direction in which the coupling of the first member 12 and the second member 13 is released, the direction of force exerted upon the first member 12 and the second member 13 when they try to separate coincides with the direction of compressive force exerted upon the adhesives 73, 73 by the fixing pieces 17, 17, . . . and the fixing pieces 25, 25, . . . , so that the fixing strength between the first member 12 and the second member 13 can be improved.

While in the foregoing, the example is described in which the adhesives 73, 73, . . . are filled into the first fixing spaces 70, 70, . . . to fix the first member 12 and the second member 13, the fixing means for filling into the first fixing spaces 70, 70, . . . is not limited to the adhesives 73, 73 . . . , but any means in which deformation is hardly generated by the compressive force when force is generated in the direction in which the coupling of the first member 12 and the second member 13 is released to exert the compressive force can be used. For example, it is considered that members (fixing means) or the like, which are formed of a resin material or a metal material, are inserted so as to be fitted into the first fixing spaces 70, 70, . . . .

However, as described above, in the case where the adhesives 73, 73, . . . are used as the fixing means, the first fixing spaces 70, 70, . . . are hermetically closed, which brings about effects of preventing dust from entering the lens barrel 11, and facilitating the fixing work.

It is known that the UV-curable adhesive used as the adhesives 73, 73, . . . generally has a small contraction percentage after curing, and as described above, the use of the UV-curable adhesive as the adhesives 73, 73, . . . allows the fixing of the first member 12 and the second member 13 to be securely performed.

Furthermore, in the lens unit 10a, the three of the first member 12, the second member 13, and the yoke 47 adhere to one another by the adhesives 74, 74 filled into the second fixing spaces 71, 71, and the first member 12 and the yoke 47 adhere to each other by the adhesives 74, 74 penetrating the clearances 72, 72; Accordingly, the adhesive strength among the first member 12, the second member 13, and the yoke 47 is high, and vibration resistance and dropping impact resistance can be improved.

As adhesives 73, 73, . . . , for example, an epoxy resin adhesive can also be used. However, in the case where the epoxy resin adhesive is used, a two-component adhesive has a disadvantage that management is hard in spite of fast curing speed, while a one-component adhesive has a disadvantage that the curing speed is slow in spite of easy management.

Accordingly, as described above, the use of the UV-curable adhesive as the adhesives 73, 73, . . . and the adhesives 74, 74 can make the management of the adhesive easier and make the adhering process shorter. Particularly, while curing time of 30 minutes or more is required when the epoxy resin adhesive is used, curing time of 5 to 30 seconds is required when the UV-curable adhesive is used. Accordingly, time required for the assembling process of the imaging unit 10 including the lens unit 10a is largely shortened.

In the case where the one-component thermosetting epoxy resin adhesive is used, the curing time becomes longer and additionally, a dedicated heat-treating furnace is necessary, thereby raising manufacturing cost, and further causing a risk such as decentering of the lens due to heat treatment. In contrast, the use of the UV-curable adhesive as the adhesives 73, 73, . . . and the adhesives 74, 74, . . . can also avoid the occurrence of these defects.

Furthermore, it is known that the UV-curable adhesive generally has lower adhesive strength to metal than the adhesive strength to resin. However, as described above, since in addition to the adhesion between the yoke 47 formed of the metal material, and the adhesion between the first member 12 and the second member 13 formed of the resin material, the first member 12 and the second member 13, which are both formed of the resin material, are performed by the adhesives 74, 74, the firm fixing state of the yoke 47 with respect to the lens barrel 11 can be assured.

As described above, by coupling and fixing the first member 12 and the second member 13, the assembling of the imaging unit 10 is completed.

As described above, the assembling of the imaging unit 10 can be performed by assembling, to the second member 13, the second biasing plate spring 39, the movable part 49, the yoke 47 with the driving magnet 48 attached, the first biasing plate spring 34, and the first member 12 in order. Accordingly, the assembling work of the imaging unit 10 including the lens unit 10a is easy, which can shorten the working time.

Figure 29:
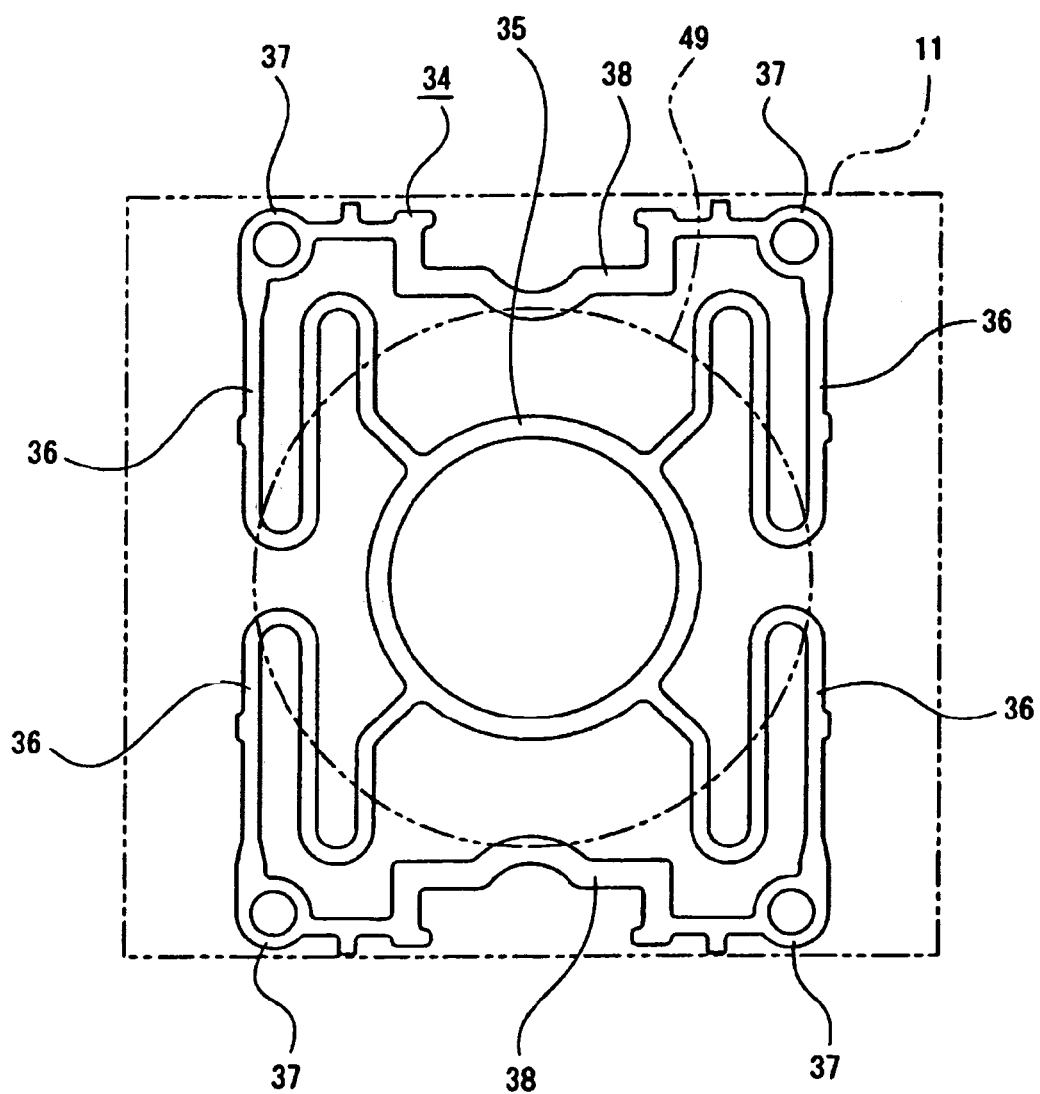
FIG. 29 is a concept view showing a positional relation of the first biasing plate spring with respect to the lens barrel and the movable part.
Figure 30:
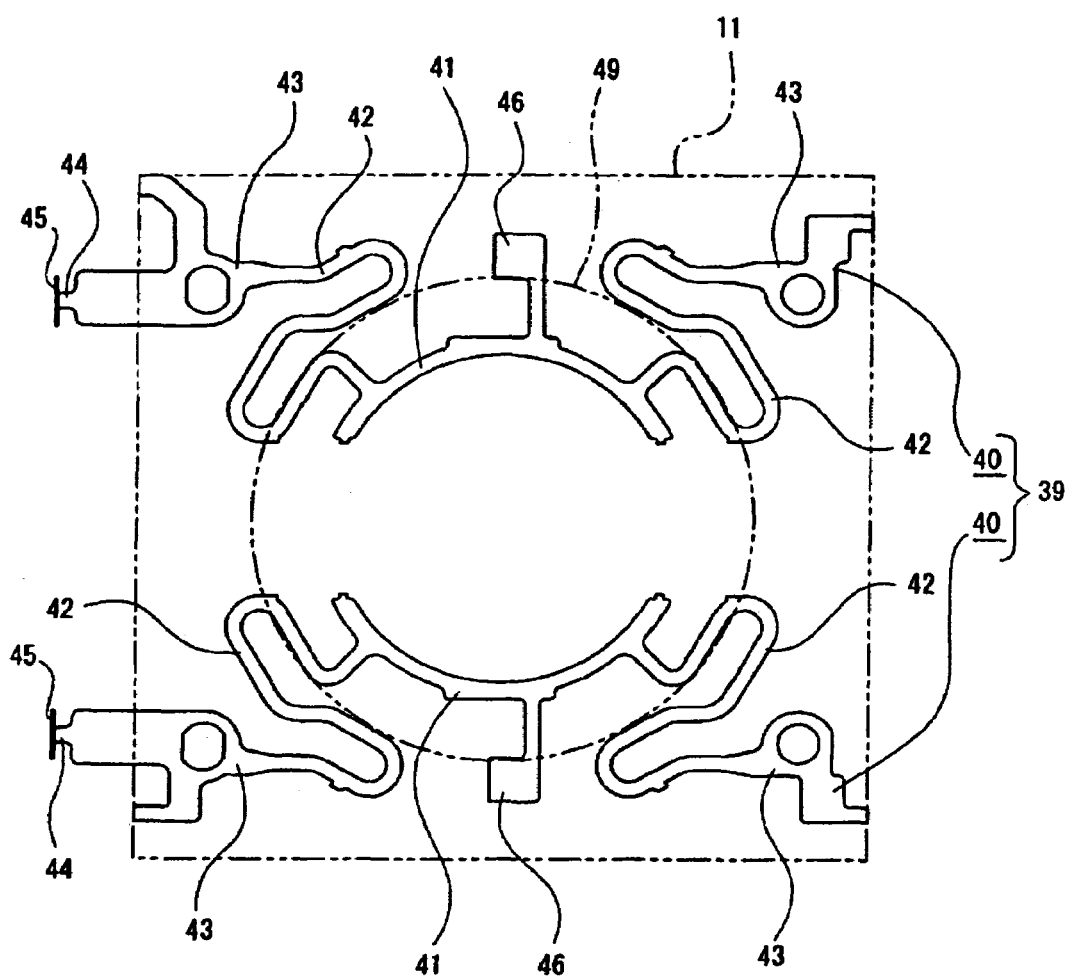
FIG. 30 is a concept view showing a positional relation of the second biasing plate spring with respect to the lens barrel and the movable part.

In an outer shape projected from the optical axis direction of the imaging unit 10 assembled in the above-described manner, the lens barrel 11 is a substantially rectangular and the movable part 49 is substantially circular (refer to FIGS. 29 and 30). In this state, the spring sections 36, 36, . . . of the first biasing plate spring 34 and the spring sections 42, 42, . . . of the second biasing plate spring 39 are located at the four corners inside of the lens barrel 11.

Accordingly, the arrangement spaces for the spring sections 36, 36, . . . , 42, 42, . . . can be minimized, which can realize the downsizing of the imaging unit 10 including the lens unit 10a.

Figure 31:
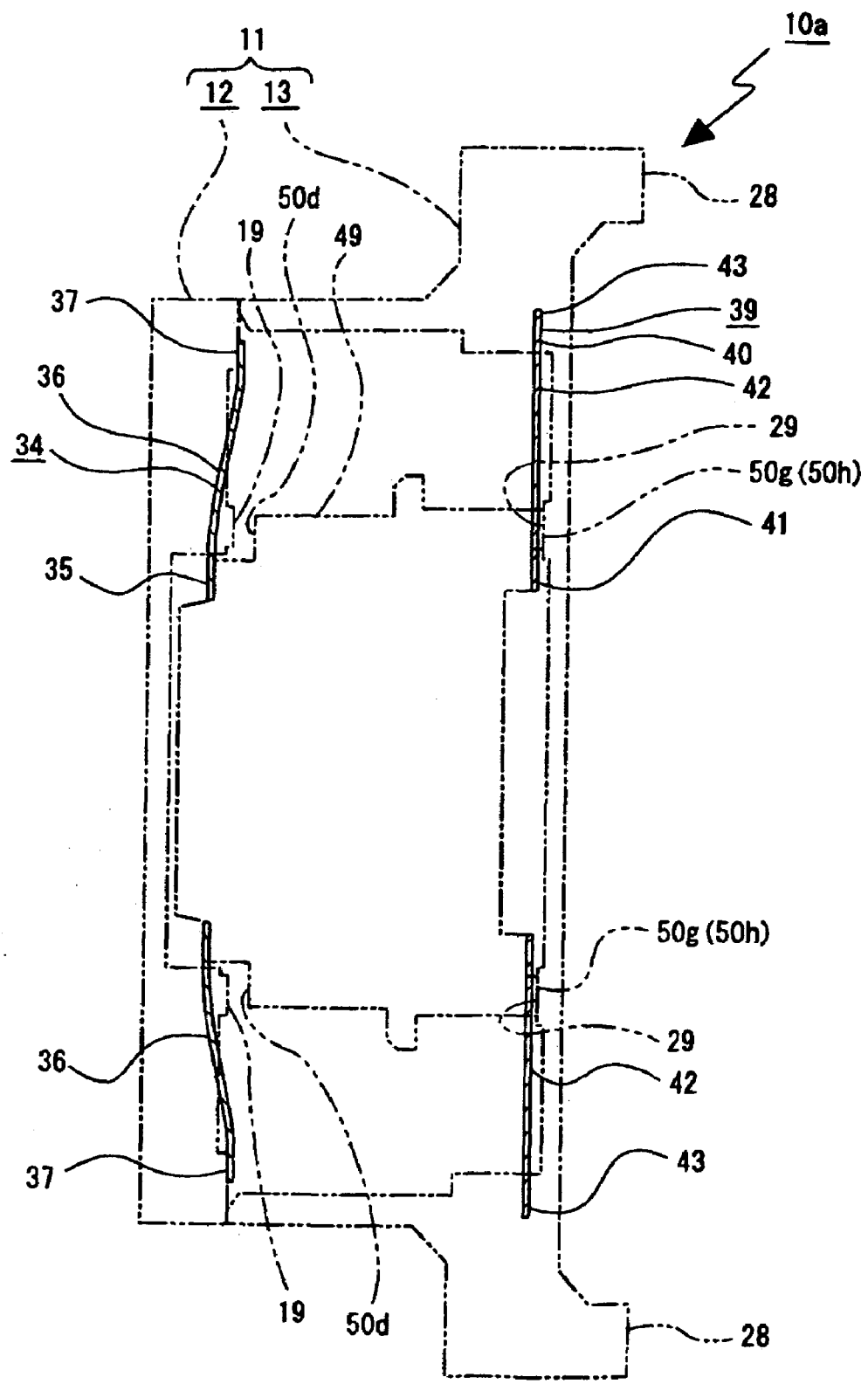
FIG. 31 is a schematic enlarged cross-sectional view of the imaging unit shown in a state where the movable part is kept at infinity.

In the imaging unit 10 assembled in the above-described manner, the spring force of the first biasing plate spring 34 is larger than that of the second biasing plate spring 39, as described above. Accordingly, as shown in FIG. 31, at non-driving time of the linear actuator 68 when the energization to the driving coil 51 is not performed, the movable part 49 is biased toward the imaging part 63 side (back side) in the optical axis direction by the biasing force of the first biasing plate spring 34, and the lens holder 50 is brought into contact with the regulating surface sections 29, 29, . . . of the second member 13, and is kept at infinity in the focus driving.

Generally, a user more often uses the imaging apparatus 1 in the state where the movable part 49 is located at infinity than in the state where it is located at macro end. Accordingly, as described above, by always keeping the movable part 49 in the state of infinity by the biasing force of the first biasing plate spring 34 at non-driving time of the linear actuator 68, electric power is not necessary in the state of high frequency of use, thereby minimizing the power consumption.

In the case where it is assumed that the frequency of use at macro end is higher than that at infinity, a configuration may be employed in which the spring force of the second biasing plate spring 39 is made larger than that of the first biasing plate spring 34, so that the movable part 49 is always kept at macro end by the biasing force of the second biasing plate spring 39 at non-driving time of the linear actuator 68 to thereby make electric power unnecessary in the state of high frequency of use.

As an example of use of the imaging apparatus 1 at macro end, there are reading of information of various displays intended for identification, such as a one-dimensional barcode and the two-dimensional barcodes 1000, 2000, as shown in FIG. 2, and the like.

In the case where the imaging apparatus 1 is used as a portable apparatus, a posture difference may be caused in the movable part 49, depending on the orientation in which the imaging apparatus 1 is used. As described above, however, since in the state of infinity with high frequency of use, the movable part 49 is pressed against the second member 13 by the biasing force of the first biasing plate spring 34 to be held, the posture difference of the movable part 49 is hardly caused, so that the image quality can be improved.

In the state where the movable part 49 is located at infinity, in the first biasing spring 34, the holding section 35 is located on the front side of the attached section 37, 37, . . . , while in the second biasing plate spring 39, the holding sections 41, 41, the spring section 42, 42, . . . and the attached sections 43, 43 . . . are located coplanarly.

Accordingly, in the second biasing plate spring 39, the holding sections 41, 41, the spring sections 42, 42, . . . and the attached sections 43, 43 . . . are located coplanarly in the state of infinity, and when the movable part 49 is moved in the optical axis direction, the holding sections 41, 41 are always located on the front side of the attached sections 43, 43.

Thus, in the imaging unit 10, in the second biasing plate spring 39, the holding sections 41, 41, the spring sections 42, 42, . . . , and the attached sections 43, 43, . . . are located coplanarly in the state of infinity, and when the movable part 49 is moved, the holding sections 41, 41 are always located on the front side of the attached sections 43, 43, . . . , so that the spring sections 42, 42, . . . deformed when the movable part 49 is moved can be arranged at a position overlapping the movable part 49 in the optical axis direction.

Accordingly, the arrangement space for the second biasing plate spring 39 in the direction perpendicular to the optical axis direction can be reduced, which can realize the downsizing of the imaging unit 10.

Moreover, in the imaging unit 10, since the first linear sections 42b, 42b, . . . and the second linear sections 42c, 42c, . . . of the second biasing plate spring 39 are formed so as to extend in the substantially tangent line direction of the holing section 41 along the holding section 41, the arrangement space of the second biasing plate spring 39 can be reduced, which can realize the downsizing of the imaging unit 10.

At driving time of the linear actuator 68, the energization to the driving coil 51 is performed. This energization is performed via the control circuit substrate 65 of the imaging part 63, and the second biasing plate spring 39. Accordingly, since the second biasing plate spring 39 is used as energization means in addition to the role of biasing the movable part 49, additional dedicated means is not necessary for energizing the driving coil 51 in the lens unit 10a, which can reduce the components in number.

Moreover, in the imaging unit 10, instead of dividing the second biasing plate spring 39 into the two spring members 40, 40, a configuration can be employed in which the first biasing plate spring 34 is connected to one end portion of the driving coil 51, and the second biasing plate spring 39 is connected to the other end portion of the driving coil 51, by which a channel for energization to the driving coil 51 is assured.

However, in the case where the assurance of the channel for energization is performed using the first biasing plate spring 34 and the second biasing plate spring 39, as described above, the imaging unit 10 is configured such that the driving magnet 48 and the yoke 47 cover the driving coil 51 from the side of the first biasing plate spring 34, and thus, there is a possibility that wiring work and connecting work of the driving coil 51 to the first biasing plate spring 34 and the second biasing plate spring 39.

Accordingly, as described above, by dividing the second biasing plate spring 39 into the two spring members 40, 40 to assure the channel for energization to the driving coil 51, workability in the wiring work and the connecting work can be improved.

Figure 32:
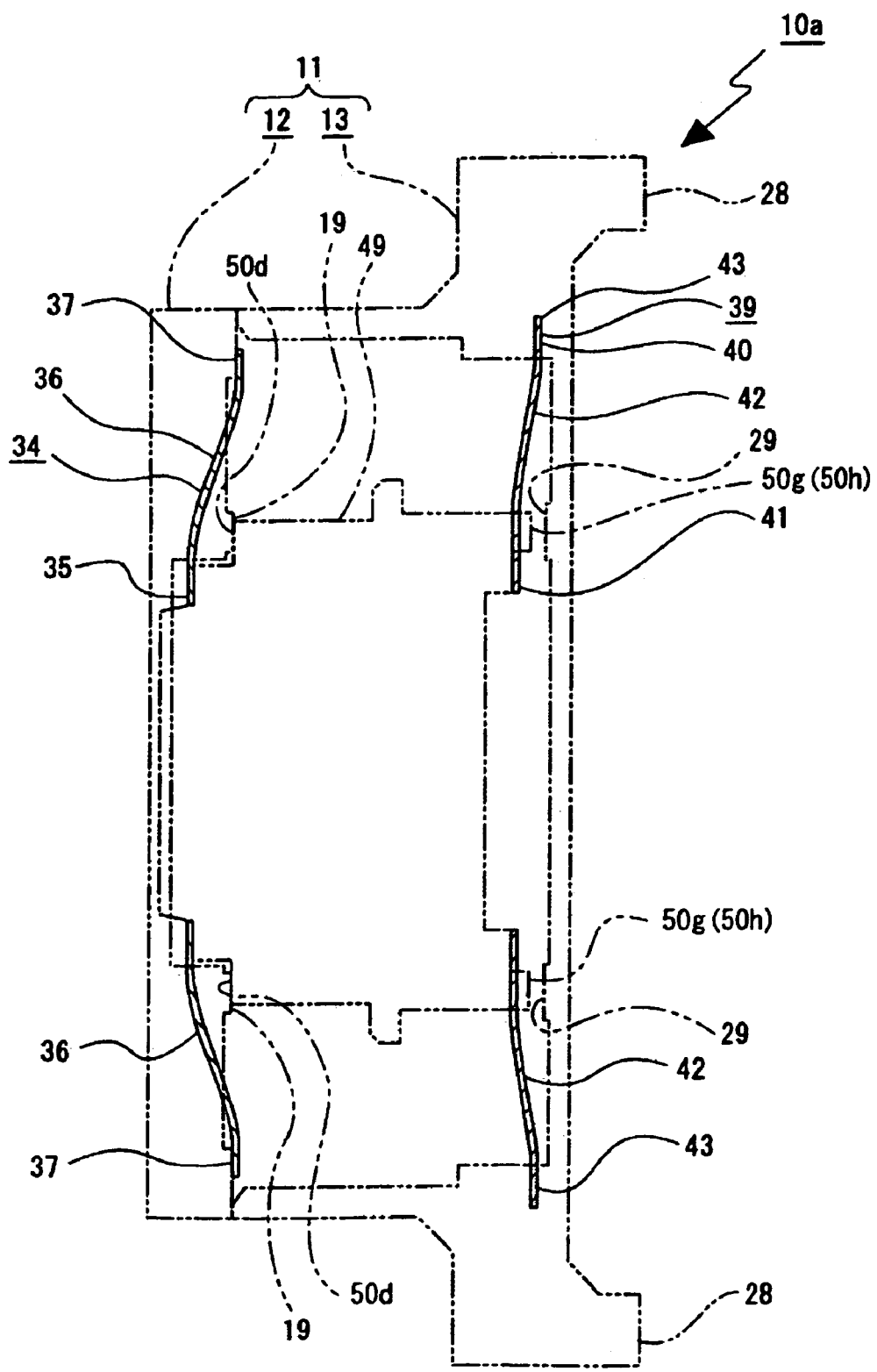
FIG. 32 is a schematic enlarged cross-sectional view of the imaging unit shown in a state where the movable part is kept at macro end.

When the energization in one predetermined direction is performed to the driving coil 51, the movable part 49 is moved toward the object side (forward) in the optical axis direction up to a position according to the magnitude of voltage by the drive of the linear actuator 68 (refer to FIG. 32), and can be moved to the macro end, where the regulated surface sections 50d, 50d, . . . of the lens holder 50 come into contact with the regulating sections 19, 19, . . . of the first member 12.

When the energization to the driving coil 51 is stopped, the movable part 49 is moved backward by the biasing force of the first biasing plate spring 34, and can be moved up to the state of infinity (refer to FIG. 31).

Figure 33:
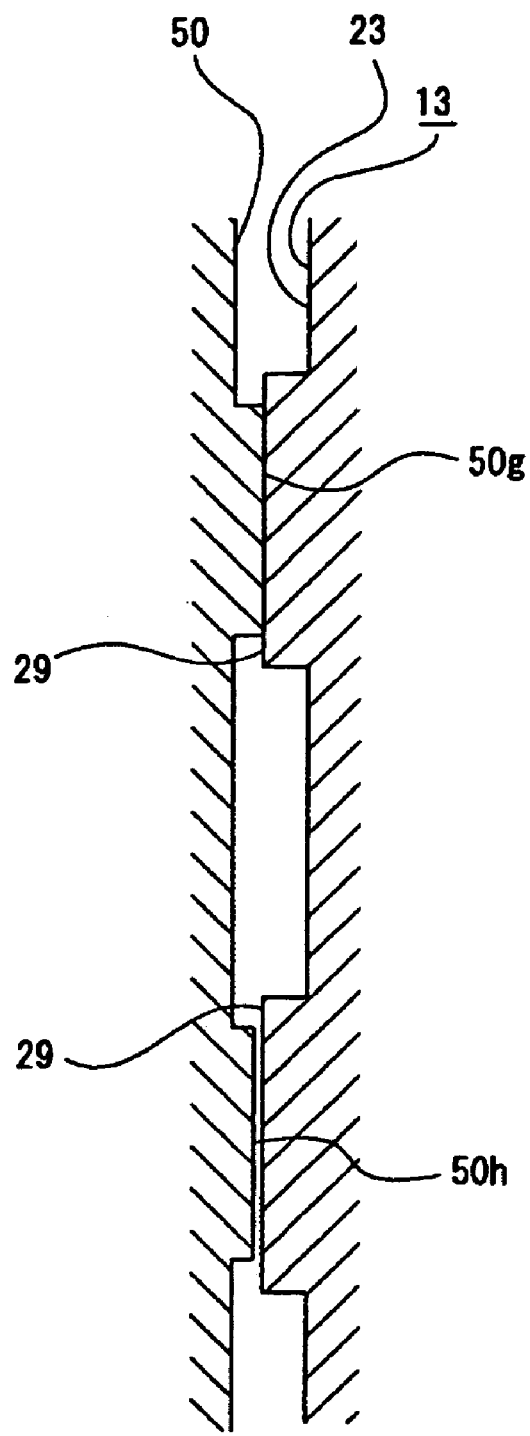
FIG. 33 is a concept view showing a state where a first regulated surface section of the lens holder and a regulating surface section of the second member are brought into contact with each other.
Figure 34:
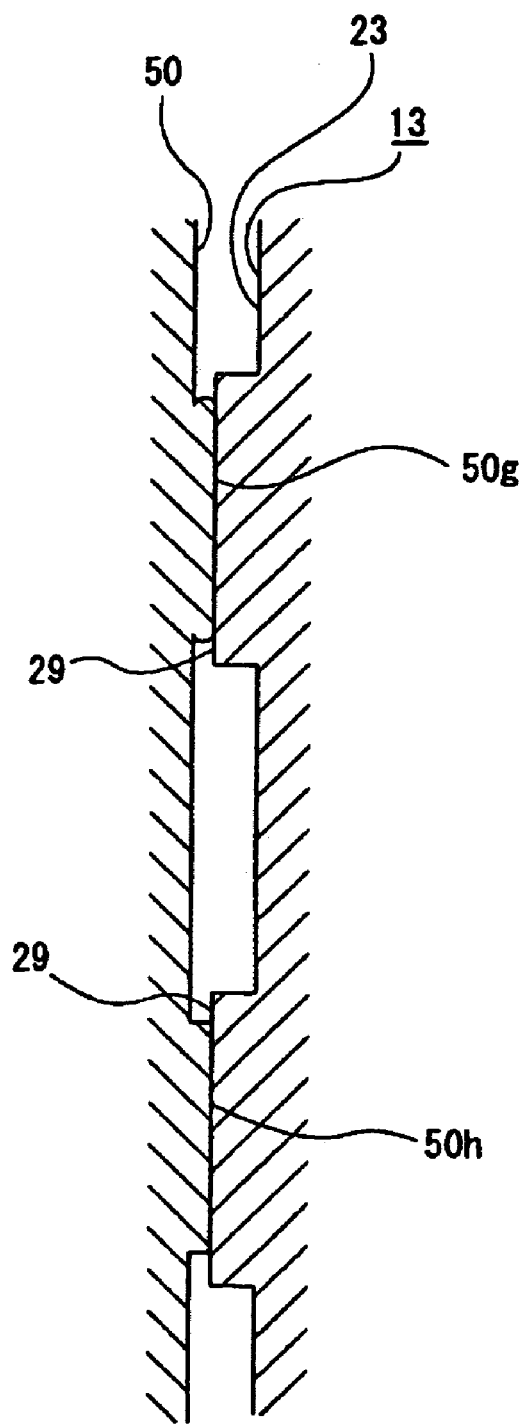
FIG. 34 is a concept view showing a state where the first regulated surface section and a second regulated surface section of the lens holder and regulating surface sections of the second member are brought into contact with one another.

When the moving section 49 is moved up to the state of infinity, the first regulated surface sections 50g, 50g, 50g formed in the lens holder 50 are brought into contact with the regulating surface section 29, 29, 29 formed in the second member 13 (refer to FIG. 33). At this time, if backward large load is applied to the movable part 4, the first regulated surface sections 50g, 50g, 50g are slightly push and then, the second regulated surface sections 50h, 50h, 50h located at a position slightly on the front side of the first regulated surface sections 50g, 50g, 50g are also brought into contact with the regulating surface sections 29, 29, 29, respectively (refer to FIG. 34).

Accordingly, even when large load is applied to the movable part 49, the large load is not applied only to the first regulated surface sections 50g, 50g, 50g, so that damage, abrasion and the like of the lens holder 50 and the second member 13 can be prevented.

Moreover, in the imaging unit 10, since the regulating surface sections 19, 19, . . . of the first member 12, the regulating surface sections 29, 29, . . . of the second member 13, and the regulated surface sections 50d, 50d, . . . , 50g, 50g, . . . 50h, 50h, . . . of the lens holder 50 are formed so as to be spaced evenly in the circumferential direction, impact caused by the contact between the lens holder 50, and the first member 12 or the second member 13 when the movable part 49 reaches the movement end can be efficiently absorbed, and the posture of the movable part 49 can be stabilized.

Furthermore, since the regulated surface sections 50d, 50d, . . . , 50g, 50g, . . . , 50h, 50h, . . . are all formed in the lens holder 50 holding the lens block 53, position accuracy of the lens block 53 in the optical axis direction can be improved and the posture of the lens block 53 can be stabilized.

Figure 35:
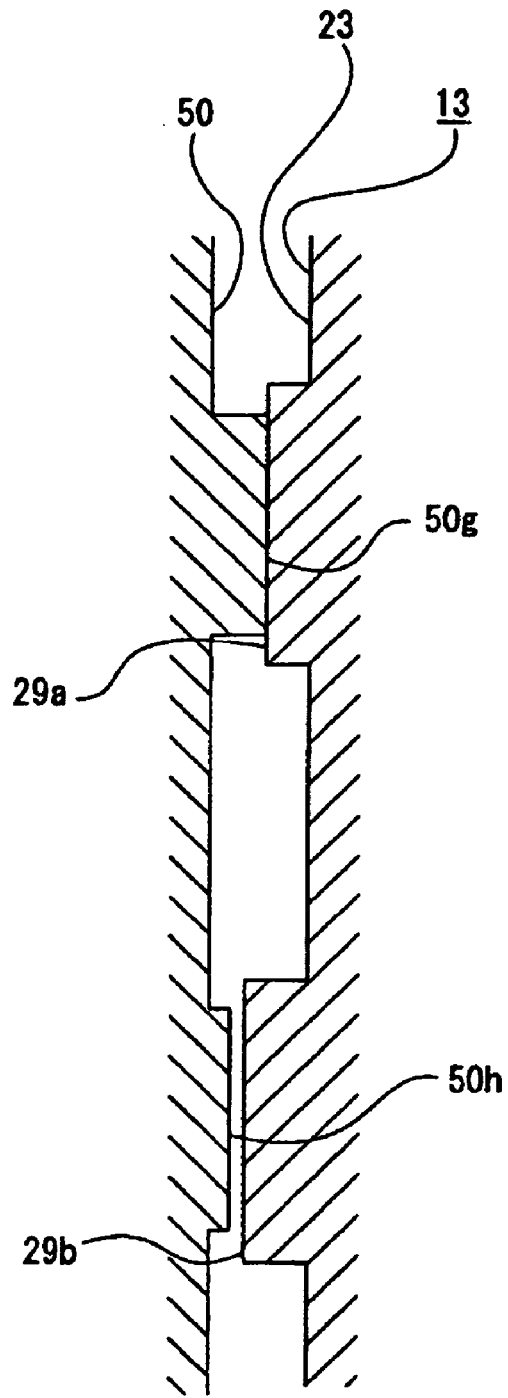
FIG. 35 is a concept view showing a state where the first regulated surface section of the lens holder and the regulating surface of the second member are brought into contact with each other in another example.

While in the foregoing, the example is described in which the regulating surface sections 29, 29, . . . located coplanarly in a plane perpendicular to the optical axis direction, and the first regulated surface sections 50g, 50g, . . . , the second regulated surface sections 50h, 50h, . . . which are located at different positions in the optical axis direction, are brought into contact, the combination of the regulating surfaces and the regulated surfaces is not limited to such an example, but for example, as shown in FIG. 35, the regulating surface 29, 29, . . . may be composed of first regulating surfaces 29a, 29a, . . . and the second regulating surfaces 29b, 29b, . . . , which are located at different positions in the optical axis direction, and the regulated surface sections may be composed of the first regulated surface sections 50g, 50g, . . . and the second regulated surface sections 50h, 50h, . . . , which are located at different positions in the optical axis direction. Alternatively, the regulating surface sections 29, 29, . . . may be composed of the first regulating surface sections 29a, 29a, . . . and the second regulating surface sections 29b, 29b, . . . , which are located at different positions in the optical axis direction, and the regulated surface sections may be composed of two regulated surface sections located coplanarly in a plane perpendicular to the optical axis direction.

Moreover, while in the foregoing, the example is described in which the two kinds of regulated surface sections 50g, 50g, . . . , 50h, 50h, . . . and the like are formed, at which the contact position of the lens holder 50 to the lens barrel 11 differs in the state of infinity, difference in the contact position of the lens holder 50 to the lens barrel 11 is not limited to the state of infinity, but it is also enabled in the state of macro end. In this case, the regulated surface sections on the front end side of the lens holder 50 and the regulating surface sections of the first member 12 may be each composed of two portions located at different positions in the optical axis direction.

As described above, in the imaging apparatus 1, the energization to the driving coil 51 allows the movable part 49 to be moved to the object side (forward) in the optical axis direction, and stopping the energization to the driving coil 51 allows the movable part 49 to be moved to the side of the imaging part 63 (backward) in the optical axis direction, so that the energizing direction to the driving coil 51 is only one way, which can make the control easier and reduce power consumption at the time of focus driving.

While in the foregoing, the example is described in which by differentiating the thickness of the first biasing plate spring 34 and the second biasing plate spring 39, which are formed of the same material, the spring force of the first biasing plate spring 34 is made larger than that of the second biasing plate spring 39, a method for making the spring force of the first biasing plate spring 34 larger than that of the second biasing plate spring 39 is not limited to the method of forming both by the same material and differentiating the thickness, but various methods such as a method of using different materials and a method of differentiating the spring sections in shape or width, for example, can be used.

Next, a shutter unit 75 is described.

The shutter unit 75 is arranged on the front side of the imaging unit 10 (refer to FIGS. 3 and 4), and is composed of a base plate 76 and required sections, which are arranged in a back surface of the base plate 76.

The base plate 76 is formed into a horizontally long rectangular shape, and has an exposure opening 76a.

Figure 36:
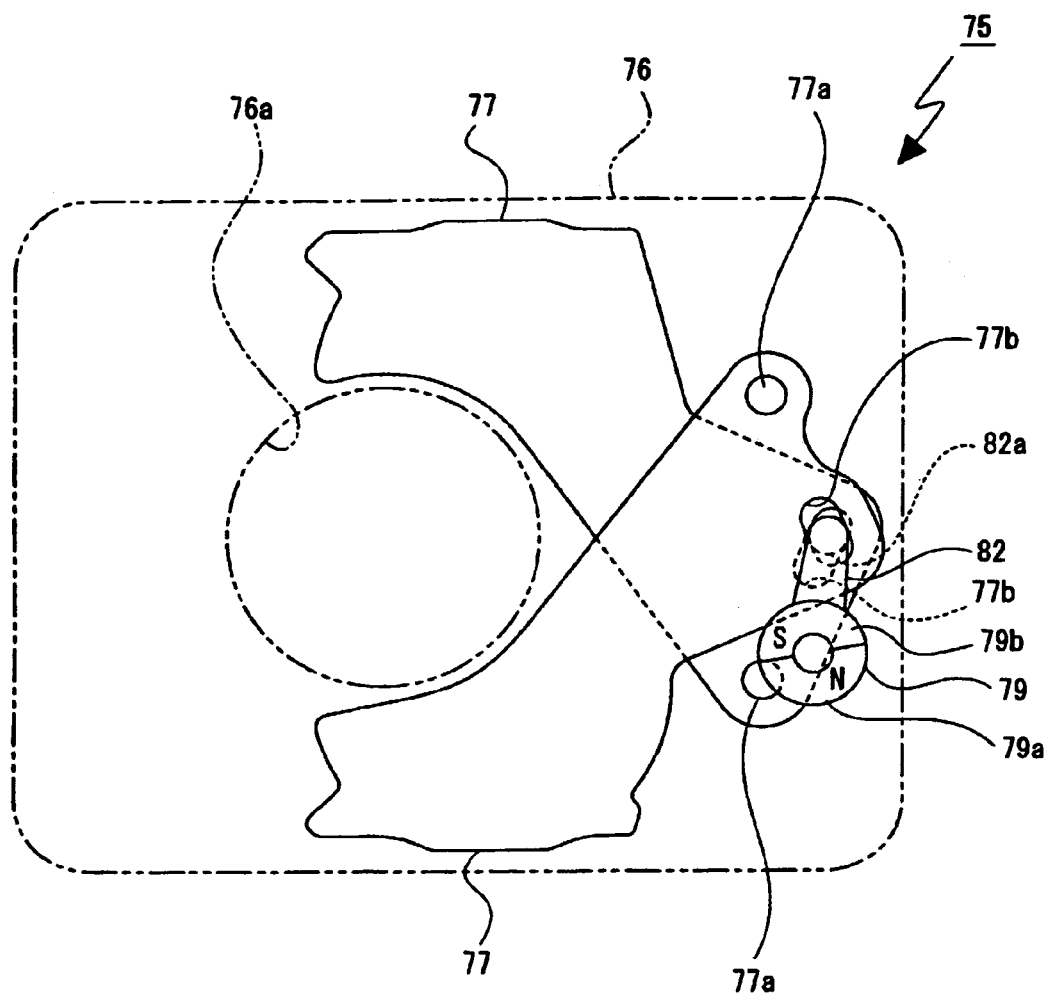
FIG. 36 is an enlarged front view showing a positional relation of an operating magnet and shutter wings when the shutter wings are at opening positions.
Figure 37:
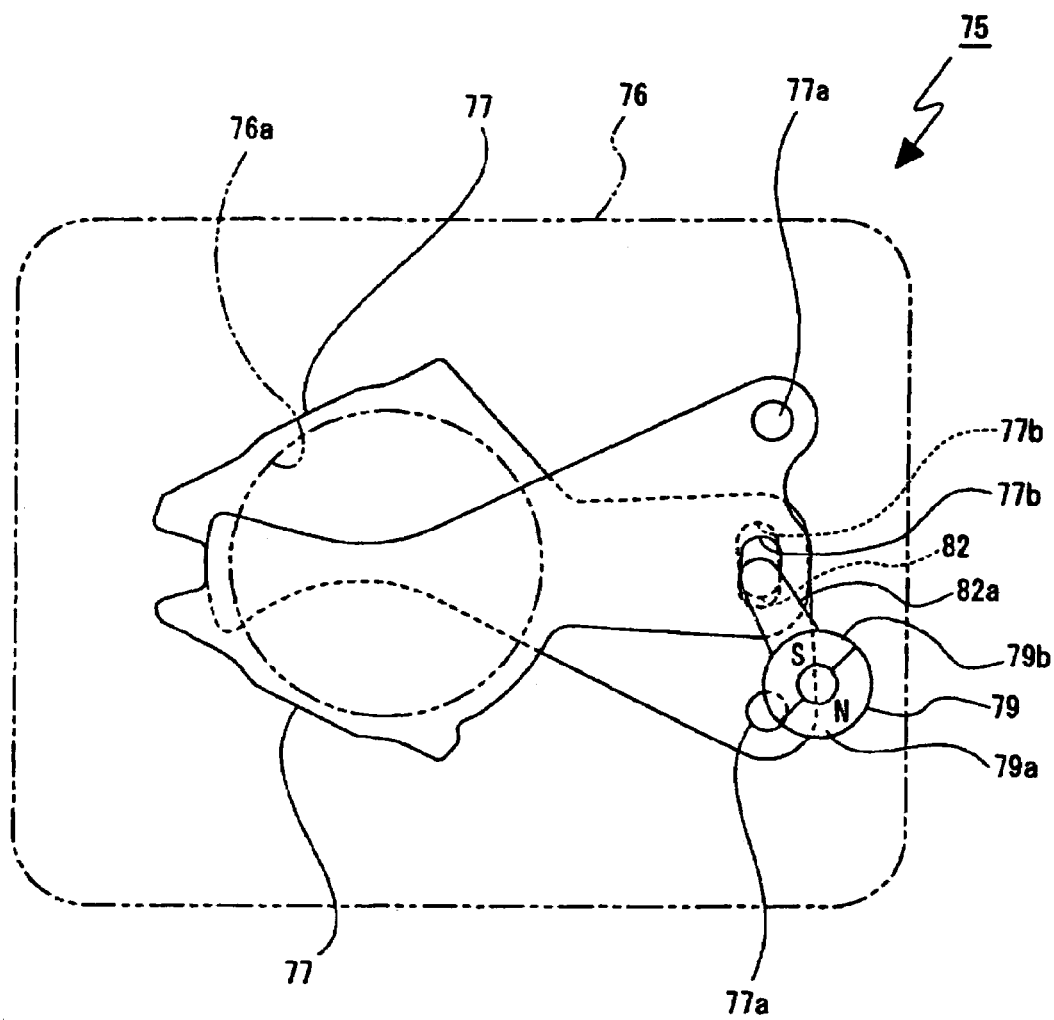
FIG. 37 is an enlarged front view showing a positional relation of the operating magnet and the shutter wings when the shutter wings are at blocking positions.

In the base plate 76, a pair of shutter wings 77, 77 are each supported movably between an opening position where the exposure opening 76a is opened (refer to FIG. 36) and a blocking position where the exposure opening 76a is blocked (refer to FIG. 37). The shutter wings 77, 77 are supported by the base plate 76 rotatably through the use of rotation fulcrum sections 77a, 77a provided in one-end portions thereof as fulcrums. In the shutter wings 77, 77, engaging long holes 77b, 77b are formed, respectively.

Figure 38:
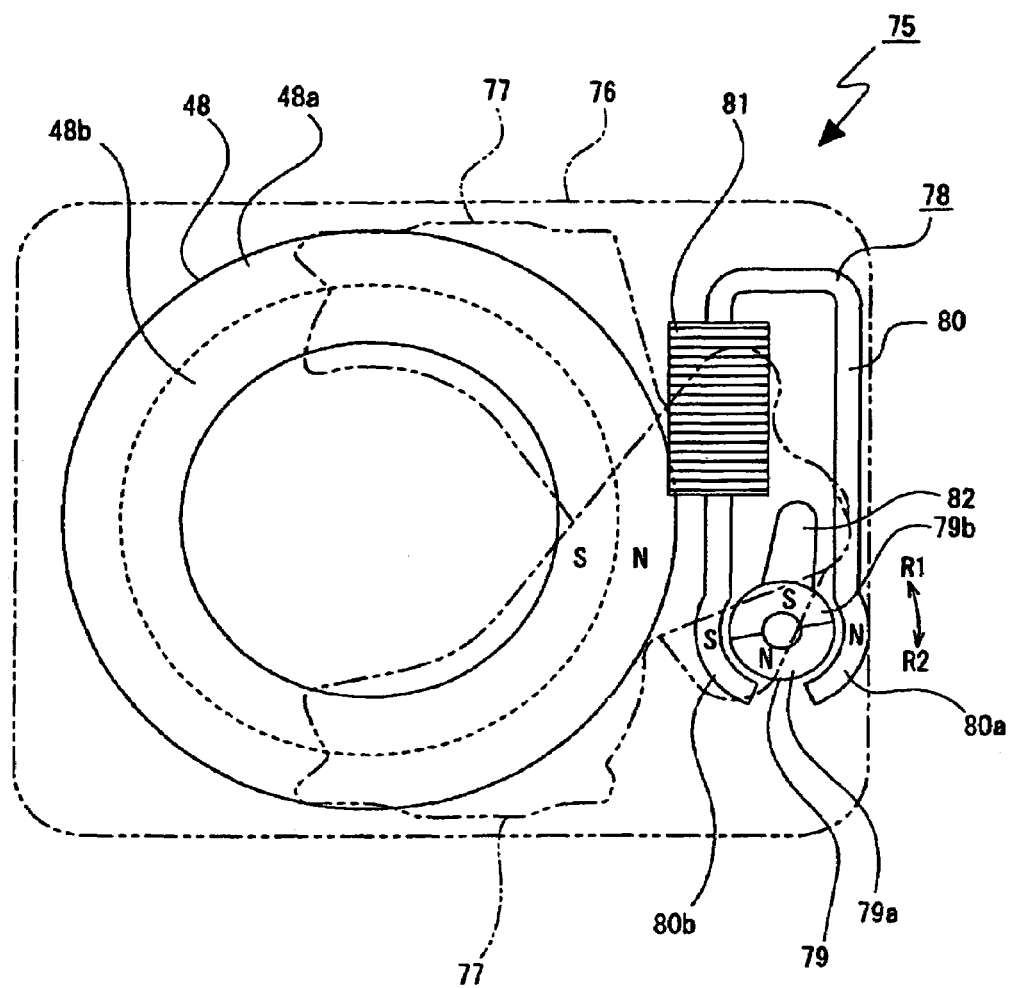
FIG. 38 is an enlarged front view showing a shutter unit when the shutter wings are at the opening positions together with a driving magnet.
Figure 39:
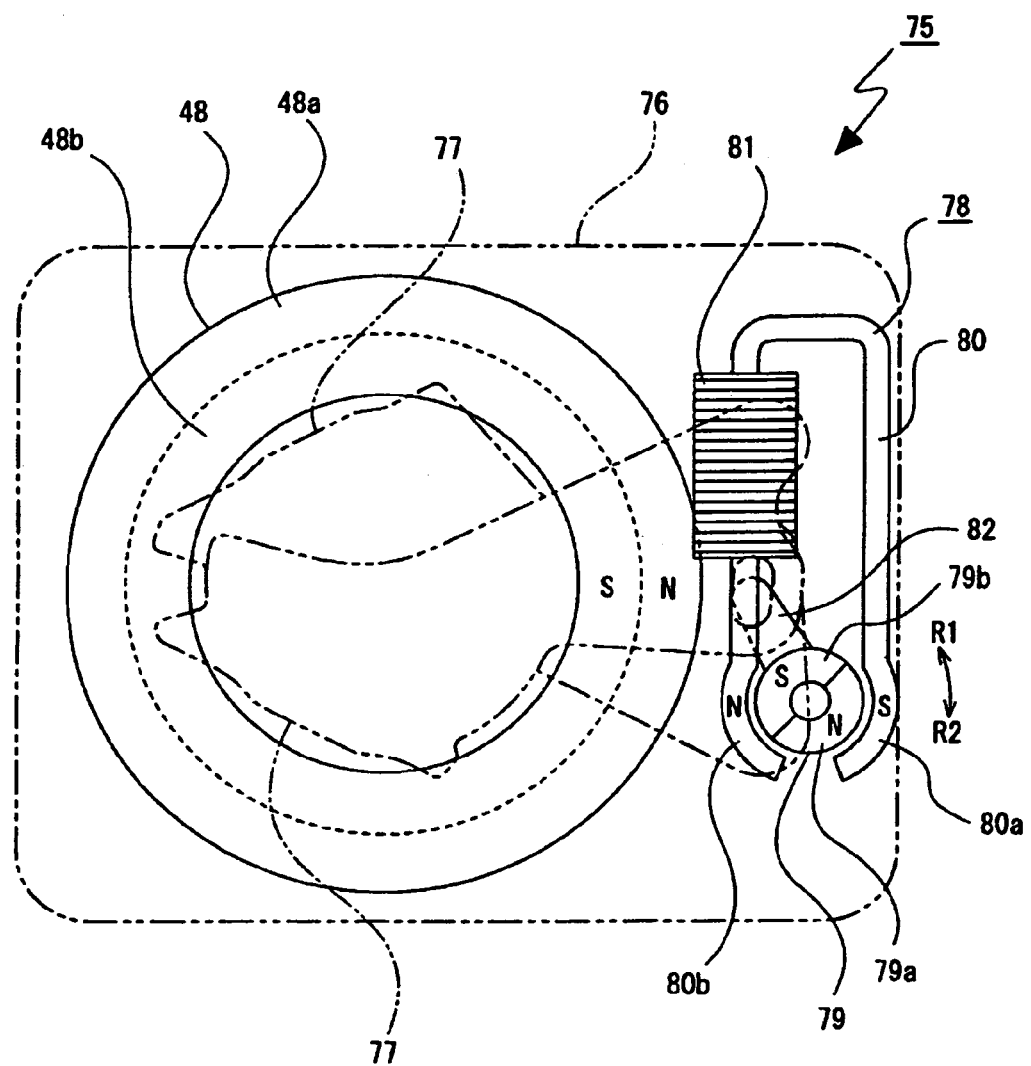
FIG. 39 is an enlarged front view showing the shutter unit when the shutter wings are at the blocking positions together with the driving magnet.

The shutter wings 77, 77 are operated so as to open and close by a shutter opening and closing mechanism 78 (refer to FIGS. 38 and 39).

The shutter opening and closing mechanism 78 has an operating magnet 79, a yoke 80, and an operating coil 81.

The operating magnet 79 is formed into a disk, and one half circle portion and the other half circle portion are magnetized so as to form different magnetic poles 79a, 79b. For example, the magnetic pole 79a is magnetized to form an N pole, and the magnetic pole 79b is magnetized to form an S pole. In the operating magnet 79, an arm 82 projected radially is provided, and in a tip portion of the arm 82, an engaging projection 82a is provided.

The operating magnet 79 is rotatable in a circumferential direction, and the arm 82 is rotated integrally with the operating magnet 79. The engaging projection 82a of the arm 82 is slidably engaged in the engaging long holes 77b, 77b of the shutter wings 77, 77. Accordingly, when the operating magnet 79 and the arm 82 are integrally rotated in an R1 direction shown in FIGS. 38 and 39, the shutter wings 77, 77 are rotated toward the blocking positions through the use of the rotation fulcrum sections 77a, 77a as the fulcrums. On the other hand, when the operating magnet 79 and the arm 82 are integrally rotated in an R2 direction shown in FIGS. 38 and 39, the shutter wings 77, 77 are rotated toward the opening positions through the use of the rotation fulcrum sections 77a, 77a as the fulcrums.

The yoke 80 is formed into a substantially inverted U shape, and lower end portions thereof are provided as actuating sections 80a, 80b each formed into a circular arc. The actuating sections 80a, 80b are arranged along and outside the operating magnet 79.

The operating coil 81 is arranged so as to be externally fitted in the yoke 80.

The center of the exposure opening 76a of the base plate 76 is on the optical axis, and the driving magnet 48 of the above-described linear actuator 68 and the operating magnet 79 have a relation of being located right and left when seen from the optical axis direction.

When the energization to the operating coil 81 in one direction is performed, for example, the actuating section 80a of the yoke 80 is magnetized to form an S pole and the actuating section 80b of the yoke 80 is magnetized to form an N pole (refer to FIG. 39). Accordingly, the operating magnet 79 is rotated in the R1 direction in which the magnetic pole 79a is attracted to the actuating section 80a and the magnetic pole 79b is attracted to the actuating section 80b, and the shutter wings 77, 77 are rotated toward the blocking positions. At this time, since in the driving magnet 48, the magnetic pole 48a on the outer peripheral side is magnetized to form an N pole, the operating magnet 79 is affected by magnetic force (leakage flux) of the driving magnet 48, and is provided impelling force in the direction being attracted to the magnetic pole 48a.

Accordingly, in the operating magnet 79, in addition to the impelling force by attachment force of the yoke 80, and the impelling force in the same direction by the magnetic force of the driving magnet 48 is provided, thereby rotating the shutter wings 77, 77 toward the blocking positions at high speed, which can improve adjustment speed of the exposure amount.

The force provided to the operating magnet 79 in the direction being attracted to the magnetic pole 48a of the driving magnet 48 is smaller than the attachment force of the yoke 80 to the operating magnet 79 when the operating coil 81 is energized.

On the other hand, when energization of the operating coil 81 in the opposite direction is performed, for example, the actuating section 80*a* of the yoke 80 is magnetized to form an N pole, and the actuating section 80*b* of the yoke 80 is magnetized to form an S pole (refer to FIG. 38). Accordingly, the operating magnet 79 is rotated in the R2 direction in which the magnetic pole 79*a* is attracted to the actuating section 80*b* and the magnetic pole 79*b* is attracted to the actuating section 80*a*, so that the shutter wings 77, 77 are rotated toward the opening positions.

While in the foregoing, the example is described in which the operation speed of the shutter wings 77, 77 toward the blocking positions is increased, on the contrary, the operation speed of the shutter wings 77, 77 toward the opening positions can also be increased as necessary by appropriately changing magnetization patterns of the driving magnet 48 and the operating magnet 79, the energization direction to the driving coil 81 or the like.

Moreover, while in the foregoing, the example is described in which the shutter unit 75 is arranged in front of the lens unit 10*a*, the location of the shutter unit 75 is not limited to the front side of the lens unit 10*a*, but for example, the shutter unit 75 may be arranged between the lens unit 10*a* and the imaging part 63.

Furthermore, while in the foregoing, the example is described in which the two shutter wings 77, 77 are provided in the shutter unit 75, the number of the shutter wings is not limited to two, but one shutter wing may be used to open and close the exposure opening 76*a*, or a plurality of shutter wings such as three or four may be used to open and close the exposure opening 76*a*, so that the number of the shutter wings is arbitrary.

Still further, while in the foregoing, the example is described in which the operating magnet 79 is formed into a disk, the shape of the operating magnet is not limited to a disk shape, but another shape, for example, a cylindrical shape may be employed.

As described above, in the imaging apparatus 1, since the impelling force by the magnetic force of the driving magnet 48, which is a component of the linear actuator 68 for moving the movable part 49 is provided to the operating magnet 79, the operation speed of the shutter wings 77, 77 can be improved without raising the cost.

Since the magnetic force of the driving magnet 48 acts as the impelling force of the operating magnet 79 when the shutter wings 77, 77 are moved toward the blocking positions, the exposure time can be shortened, and the quality of an image photographed by the imaging apparatus 1 can be improved.

In order to further improve the operation speed of the operating magnet 79, the driving magnet 48 is formed into an annular shape, and the respective magnetic poles 48*a*, 48*b* are magnetized to form different poles, while the operating magnet 79 is formed into a disk and the respective half circle portions are magnetized to form the different poles 79*a*, 79*b*, thereby rotating the operating magnet 79 in the direction according to the energizing direction to the operating coil 81, so that the configuration is easy, which can simplify the mechanism of the imaging apparatus 1.

While in the foregoing, the example is described in which the lens unit 10*a* is applied to the imaging apparatus that performs focus driving, a lens unit 10*a* can also be applied to an apparatus that performs zoom driving.

Figure 40:
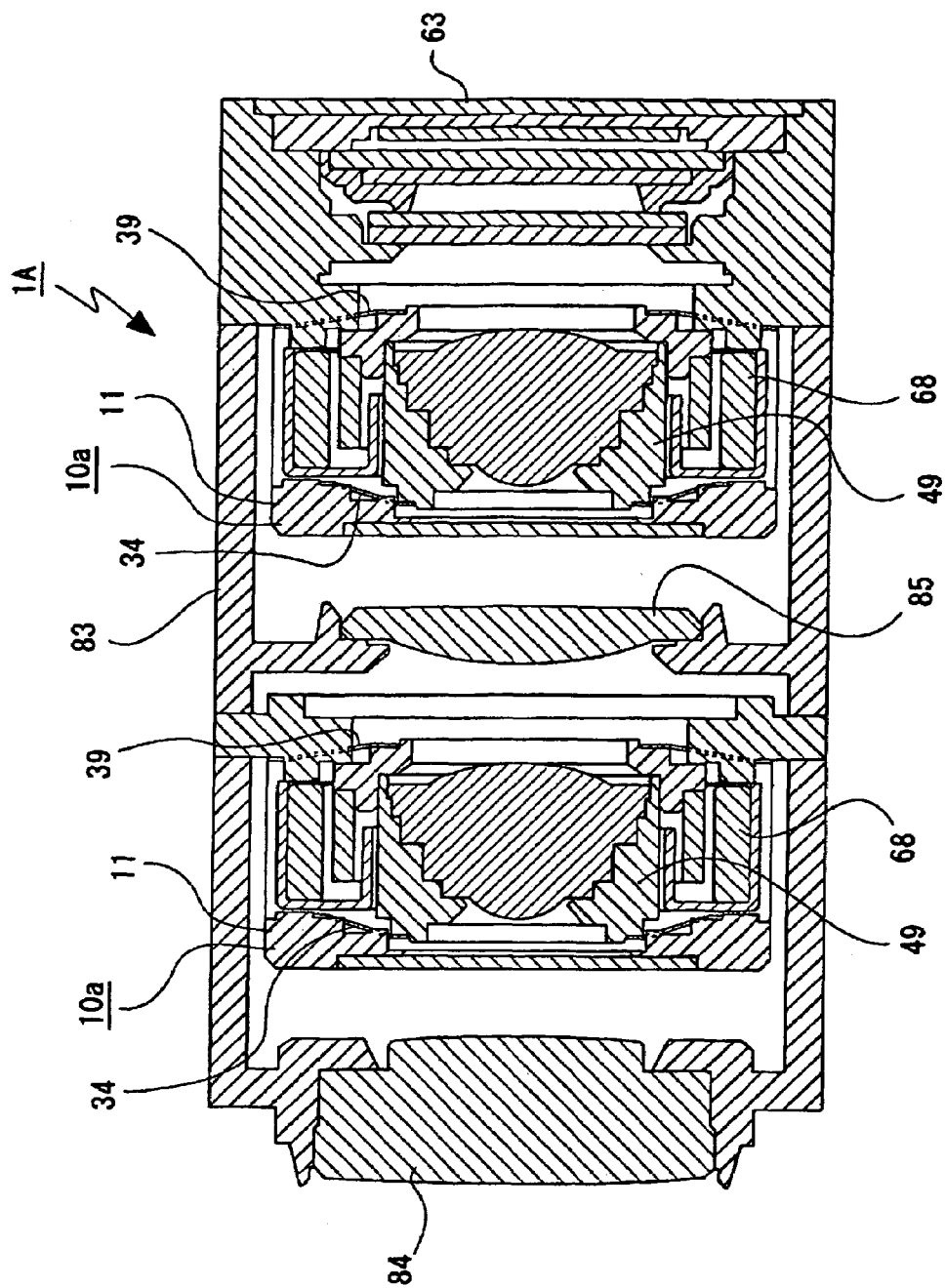
FIG. 40 is an enlarged cross-sectional view showing an example of an imaging apparatus in which two lens units are arranged.

Also, as shown in FIG. 40, the lens unit 10*a* can be applied to an imaging apparatus 1A that performs focus driving and zoom driving. An example of the imaging apparatus 1A is described below.

The imaging apparatus 1A has the lens units 10*a*, 10*a* arranged inside of an outside lens barrel 83. The lens unit 10*a* arranged on the front side is intended for zoom, while the lens unit 10*a* on the back side is intended for focus. The imaging part 63 is arranged in a back end portion of the outside lens barrel 83.

A first lens 84 is attached to a front end portion of the outside lens barrel 83 as a first group lens, and a second lens 85 is attached as a third group lens inside of the outside lens barrel 83. The second lens 85 is arranged between the lens units 10*a*, 10*a*. Accordingly, the movable lenses of the movable part 49 in the lens unit 10*a* on the front side function as second group lenses and the movable lenses of the movable part 49 in the lens unit 10*a* on the back side function as fourth group lens.

In the imaging apparatus 1A configured as described above, by the drive of the linear actuator 68 of the lens unit 10*a* on the front side, the movable part 49 is moved in an optical axis direction while being held by the first biasing plate spring 34 and the second biasing plate spring 39 to perform zoom, and by the drive of the linear actuator 68 of the lens unit 10*a* on the back side, the movable part 49 is moved in an optical axis direction while being held by the first biasing plate spring 34 and the second biasing plate spring 39 to perform focus.

The above reference to the vertical and anteroposterior directions is only intended for convenience, and the directions are not limited to these directions.

The specific shapes and structures of the respective parts and portions indicated in the above-described preferred embodiments are only examples of the embodiments when the present invention is carried out, and the technical scope of the present invention should not be construed limitedly by these.

The present invention contains subject mater related to Japanese Patent Application No. JP2005-301976 filed in the Japanese Patent Office on Oct. 17, 2005, the entire contents of which being incorporated herein by reference.

What is claimed is:

1. A lens unit, comprising:
   a lens barrel;
   an imaging optical system in the lens barrel;
   a movable part having a movable lens, the movable part being moveable in an optical axis direction with respect to the lens barrel;
   a linear actuator for driving the movable part in the optical axis direction; and
   a pair of biasing plate springs, the springs having a holding section for holding the movable part, spring sections that can be resiliently deformed for biasing the movable part in the optical axis direction, and attached sections attached to the lens barrel,
   wherein a thickness direction of the biasing plate springs coincides with the optical axis direction,
   wherein the holding section of the biasing plate springs forms a circular arc,
   wherein at least a portion of the spring sections of the biasing plate springs has a shape extending in a direction substantially along the holding section on an outer peripheral side of the holding section, and
   wherein a spring force of one of the pair of biasing plate springs is larger than a spring force of the other of the pair of biasing plate springs for holding the moveable part at one end of the lens barrel when the linear actuator is not driving the moveable part.

2. The lens unit according to claim 1, further comprising:
regulating surface sections in the lens barrel, the regulating surface sections regulating movement of the movable part in the optical axis direction; and
regulated surface sections at positions spaced evenly in a circumferential direction about an optical axis, the regulated surface sections contacting the regulating surface sections of the lens barrel for regulating the movement of the moveable part.

3. The lens unit according to claim 2, wherein the regulated surface sections comprise a first regulated surface section and a second regulated surface section; and
wherein the first regulated surface section and the second regulated surface section are different in distance from the regulating surface sections in the optical axis direction.

4. The lens unit according to claim 2, wherein the movable part comprises a lens block having a plurality of lenses, a lens holder holding the lens block, a coil holder to which the lens holder is attached, and a driving coil wound around the coil holder.

5. The lens unit according to claim 1, wherein the holding section, the spring sections, and the attached sections of one of the biasing plate springs are located coplanarly at one movement end in the optical axis direction of the movable part.

6. An imaging apparatus having a lens unit, the lens unit comprising:
a lens barrel;
an imaging optical system in the lens barrel;
a movable part having a movable lens, the movable part being moveable in an optical axis direction with respect to the lens barrel;
a linear actuator for driving the movable part in the optical axis direction; and
a pair of biasing plate springs, the springs having a holding section for holding the movable part, spring sections that can be resiliently deformed for biasing the movable part in the optical axis direction, and attached sections attached to the lens barrel, a thickness direction of the biasing plate springs coinciding with the optical axis direction,
wherein the holding section of the biasing plate springs forms a circular arc,
wherein at least a portion of the spring sections of the biasing plate springs has a shape extending in a direction substantially along the holding section on an outer peripheral side of the holding section, and
wherein a spring force of one of the pair of biasing plate springs is larger than a spring force of the other of the pair of biasing plate springs for holding the moveable part at one end of the lens barrel when the linear actuator is not driving the moveable part.

* * * * *